United States Patent
Dupont-Nivet et al.

(10) Patent No.: US 12,315,653 B2
(45) Date of Patent: May 27, 2025

(54) ATOMIC CHIP FOR ULTRA-COLD ATOM INERTIAL SENSOR AND ASSOCIATED SENSOR

(71) Applicant: THALES, Courbevoie (FR)

(72) Inventors: Matthieu Dupont-Nivet, Palaiseau (FR); Benjamin Wirtschafter, Palaiseau (FR)

(73) Assignee: THALES, Courbevoie (FR)

( * ) Notice: Subject to any disclaimer, the term of this patent is extended or adjusted under 35 U.S.C. 154(b) by 438 days.

(21) Appl. No.: 17/924,340

(22) PCT Filed: May 7, 2021

(86) PCT No.: PCT/EP2021/062197
§ 371 (c)(1),
(2) Date: Nov. 9, 2022

(87) PCT Pub. No.: WO2021/228722
PCT Pub. Date: Nov. 18, 2021

(65) Prior Publication Data
US 2023/0178262 A1    Jun. 8, 2023

(30) Foreign Application Priority Data

May 14, 2020    (FR) ...................................... 2004743

(51) Int. Cl.
*G21K 1/00*        (2006.01)
*G01P 3/36*        (2006.01)

(52) U.S. Cl.
CPC ................ *G21K 1/006* (2013.01); *G01P 3/36* (2013.01)

(58) Field of Classification Search
USPC ........................................................ 250/251
See application file for complete search history.

(56) References Cited

U.S. PATENT DOCUMENTS

| 2018/0352642 | A1* | 12/2018 | Dupont-Nivet | ........ | G01C 19/64 |
| 2022/0397396 | A1* | 12/2022 | Wirtschafter | .......... | G01C 19/64 |
| 2022/0397397 | A1* | 12/2022 | Wirtschafter | .......... | G01C 19/64 |

FOREIGN PATENT DOCUMENTS

| CN | 102 927 978 A | 2/2013 |
| WO | 2017/089489 A1 | 6/2017 |

OTHER PUBLICATIONS

Ammar, et al., "Symmetric micro-wave potentials for interferometry with thermal atoms on a chip", Phys. Rev. A 91, 2015.

* cited by examiner

*Primary Examiner* — Kiet T Nguyen
(74) *Attorney, Agent, or Firm* — BakerHostetler

(57) ABSTRACT

An atom chip for an ultracold-atom sensor, the chip includes an XY-plane normal to a Z-axis, the atom chip comprising: first and second coplanar waveguides suitable for propagating microwaves at respective angular frequencies $\omega_a$ and $\omega_b$, the waveguides being placed symmetrically on either side of the X-axis and being referred to as X-wise guides, first and second coplanar waveguides suitable for propagating microwaves at respective angular frequencies $\omega'_a$ and $\omega'_b$, the waveguides being placed symmetrically on either side of an axis the projection of which in the XY-plane is along an axis Y' that is different from the X-axis and that is contained in the XY-plane, and being referred to as Y'-wise guides, the X-wise guides being electrically insulated from the Y'-wise guides, an intersection of the guides forming a parallelogram of center O defining an origin of the reference frame XYZ, at least a first conductive wire and a second conductive wire the respective projections of which in the XY-plane are secant at O and make between them an angle larger than or equal to 20°, the conductive wires being suitable for being passed through by DC currents.

18 Claims, 23 Drawing Sheets

ATOMIC CHIP FOR ULTRA-COLD ATOM INERTIAL SENSOR AND ASSOCIATED SENSOR

CROSS-REFERENCE TO RELATED APPLICATIONS

This application is a National Stage of International patent application PCT/EP2021/062197, filed on May 7, 2021, which claims priority to foreign French patent application No. FR 2004743, filed on May 14, 2020, the disclosures of which are incorporated by reference in their entirety.

FIELD OF THE INVENTION

The present invention relates to the field of ultracold-atom inertial sensors. More particularly, the invention relates to chips allowing measurement of an angular velocity about two or three measurement axes and to associated sensors.

BACKGROUND

The sensor described in document WO2017089489 describes an on-chip ultracold-atom inertial sensor (gyroscope) that uses trapped matter waves that describe closed paths enclosing an area, the structure and operating principle of this sensor being recalled below.

Measurements of rotation in this type of device are carried out by exploiting the Sagnac effect. The phase shift $\theta$ induced by the Sagnac effect between two matter waves counter-rotating in a reference frame rotating at an angular speed $\Omega$, is given by:

$$\theta = \frac{2Am}{\hbar}\Omega \quad (1)$$

where A is the area enclosed by the atomic paths, m the mass of the atoms and $\hbar$ the reduced Planck constant.

Ultracold atoms are defined to be atoms the temperature of which is lower than 400 nanokelvins, and preferably lower than 300 nanokelvins. The temperature of thermal ultracold atoms is, for example for Rubidium atoms, comprised between 50 and 400 nanokelvins and preferably between 100 and 300 nanokelvins.

The principle is to get a path to be travelled by two counter-propagating clouds of magnetically trapped atoms. The magnetic trap is formed and moved along the path via conductive wires and microwave guides, for example arranged as illustrated in FIG. 1.

FIG. 1 schematically illustrates an ultracold-atom chip 1, ultracold atoms 12 thereof and the path 16 of two atom clouds N1 and N2. One segment of the surface of the chip 1 forms a measurement plane 13. An axis normal to the measurement plane 13 defines the measurement axis Z, about which a measurement of rotation $\Omega_z$ is performed by the gyrometer.

The chip 1 comprises means suitable for generating a first ultracold-atom trap T1 and a second ultracold-atom trap T2, a trap allowing a cloud of ultracold atoms 12 to be immobilized in an internal state different from the other trap, at a predetermined distance h from said measurement plane 13. For example, the trap T1 comprises atoms in the electronic state |a> (cloud N1) and the trap T2 comprises atoms in the state |b> (cloud N2). States |a> and |b> are separated by a frequency $\omega_0/2\pi$. For example, in the case of rubidium 87 it is a question of the two hyperfine states $|F=1, m_F=-1\rangle$ and $|F=2, m_F=1\rangle$, which are separated by about 6.8 GHz.

These means also allow the clouds to be moved along the path 16, which is located in a plane parallel to the measurement plane 13, at a height h from this plane, such as illustrated in FIG. 1. These means consist of waveguides and conductive wires such as described below.

The means comprise a first waveguide CPW1 and a second waveguide CPW2 suitable for propagating microwaves at angular frequencies $\omega_a$ and $\omega_b$. The waveguides are parallel and placed symmetrically with respect to a Y-axis of the measurement plane. The two waveguides CPW1 and CPW2 are connected to at least one generator of voltage or current at microwave frequencies. For example, each of the waveguides is produced by depositing three parallel conductive wires so as to form a coplanar waveguide. In other embodiments, other types of waveguides may be used, in particular waveguides production of which is compatible with microfabrication techniques employing deposition or etching. It is possible, for example, to produce a microstrip line.

The means also comprise conductive wires that are integrated into the chip 1 and able to be passed through by DC currents. The conductive wires are assorted into a conductive wire WIz along an axis of symmetry Y perpendicular to X and contained in the measurement plane 13, and into a plurality of n conductive wires WIdi, the index i varying from 1 to n, that are mutually parallel and parallel to the X-axis, n being at least equal to 2. In the example of FIG. 1 n=3, i.e. there are three conductive wires WId1, WId2 and WId3. The wires are arranged so as to define n crossing points Ci (crossing between WIz and WIdi) located on the Y-axis, and here 3 crossing points C1, C2, C3.

Each conductive wire is connected to one or more current and/or voltage generators, themselves connected to a processing unit comprising at least one microprocessor. The voltage and/or current generators allow both DC currents and AC currents to be driven through the wires. In particular, DC currents are driven through the conductive wires.

In the sensor, the atom chip 1 is placed in a vacuum chamber, the vacuum of which is for example maintained using an ion pump and that preferably comprises magnetic shielding. The vacuum chamber comprises a source of ultracold atoms. The source of ultracold atoms is defined by:

an atom dispenser, for example one achieved by a heated filament that generates a rubidium vapor;

a primary (optical and/or magnetic) atom trap, allowing a cloud of ultracold atoms to be pre-cooled and placed in the vicinity of the chip, with a view to loading with atoms the magnetic traps T1 and T2 described below.

The vacuum chamber also comprises a magnetic-field source, external to the chip 1. It allows a uniform and static magnetic field 20 to be generated over a thickness at least of the order of a height h above the measurement plane 13. Advantageously, the direction of the uniform magnetic field is parallel to the measurement plane.

In FIG. 1, the path 16 (dotted lines) illustrates the path of the clouds of ultracold atoms 12. This closed path defines an area denoted A. A distance h separates the plane of the path 16 and the measurement plane 13 of the chip. Preferably h is comprised between 500 nm and 1 mm, and preferably between 5 μm and 500 μm.

FIG. 2 illustrates the geometry of the guides and wires of the atom chip as well as the traps T1 and T2.

The specific arrangement of the conductive wires and of the waveguides, in association with the uniform magnetic field of the source, makes it possible to easily obtain two traps T1 and T2 as illustrated in part a) of FIG. 2. Each trap T1 and T2 has the same non-zero minimum value V0, and an identical curvature, a necessary condition for the sensor to operate. Specifically, as explained below, when a DC current is applied to at least two conductive wires of a crossing point, the minimum of the potential well created is located plumb with this crossing point. When microwave power is then sent through the waveguides, this central well is converted into two wells that are located on either side of the initial well in the direction of the waveguides. If the initial well was not located strictly at equal distance from the two waveguides, the two potential wells created will not have strictly the same minimum value V0 and the same curvature.

Part c) of FIG. 2 illustrates the layout of the conductive wires defining the initial crossing point C1 and of the waveguides (seen from above). Part b) of FIG. 2 illustrates the corresponding layout of the conductive wires and of the waveguides printed on a chip seen in cross-sectional profile, the cross section being through the conductive wire WId1, which intersects the conductive wire WIz along the axis of symmetry Y. The waveguides CPW1 and CPW2 are coplanar waveguides located on a first level N1. The insulating layer 18 advantageously allows the measurement plane to be flattened. The material of the electrically insulating layer may for example be silicon dioxide, silicon nitride or benzocyclobutene. A conductive material, gold for example, is used to manufacture the conductive wires, and is deposited on a substrate 15, forming a second level N2. The substrate may for example be made of silicon, of aluminum nitride or of silicon carbide.

Part a) shows the symmetrical separation of ultracold atoms, which is specific to the internal state of said ultracold atoms, and more precisely to variations in potential as a function of position on the X-axis of the chip 1.

Curve "a", which has been plotted in black, shows a potential well corresponding to the association of the uniform magnetic field and of the field created by two secant conductive wires—the wire WIz passed through by the current $I_z$ and the wire WId1 passed through by the current Id1. A local potential well forming a three-dimensional atom trap T is generated. A cloud of ultracold atoms may be trapped therein and cooled.

Curve "b", which has been plotted with a dashed light-gray line, schematically shows the potential created by the transmission of microwaves at the frequency $\omega_b$ through the waveguide CPW1. The field emitted by the passage of microwaves at the frequency $\omega_b$ allows the energy of the ultracold atoms to be modified and the atoms of internal states |b> to be moved. Curve "e", which has been plotted with a solid light-gray line, illustrates the potential seen by the internal states |b> as a result of the contributions illustrated by curve "a" and by curve "b" to the end potential. Curve "e" has a local potential minimum allowing a cloud of ultracold atoms of internal states |b> to be trapped locally.

Similarly, curve "d", which has been plotted with a dashed dark-gray line, schematically shows the potential created by the transmission of microwaves at the frequency $\omega_a$ through the waveguide CPW2. The field emitted by the passage of microwaves at the frequency $\omega_a$ allows the energy of the ultracold atoms to be modified and the atoms of internal states |a> to be moved. Curve "c", which has been plotted with a solid dark-gray line, illustrates the potential seen by the atoms of internal states |a> as a result of the contributions illustrated by curve "a" and by curve "d" to the end potential. Curve "c" has a local energy minimum allowing a cloud of ultracold atoms of internal states |a> to be trapped locally.

Clouds of ultracold atoms of internal states |a> and |b> may be separated and trapped symmetrically with respect to the axis of symmetry Y by simultaneously making waves of frequency $\Omega_a$ propagate through CPW2 and waves of frequency $\omega_b$ propagate through CPW1. To obtain two traps the minima of which are of same value V0 and the curvatures of which are of same value, it is important for the crossing point C1 to be placed at an equal distance from CPW1 and CPW2, i.e. on the axis of symmetry Y.

FIG. 3 illustrates the principle of generation of the path 16. Part a) of FIG. 3 schematically shows a sequence of the movement of each of the clouds of ultracold atoms, at characteristic times $t_1$ to $t_9$. Part b) illustrates, in a complementary manner, a sequence of the various currents applied to the conductive wires, of the powers applied to the waveguides and of the frequencies applied to the waveguides, at the times corresponding to the times of part a).

In the sequence presented in FIG. 3, the current $I_z$ (not shown) flowing through WIz is kept at a constant value. In part b), the values of the currents, of the powers and of the frequencies are arbitrary values. The y-axis labelled δ frequency corresponds to a frequency variation expressed in arbitrary units about an average frequency value. The currents passing through the conductive wires may be comprised between 100 pA and 10 A, and the angular frequencies injected into the waveguides may be comprised between 6.6 GHz and 7 GHz in the case of use of rubidium atoms.

In a step A0, atoms are prepared. A cloud of ultracold atoms 12 is generated, this including phases of dispensing said atoms, of cooling said atoms, of initializing said atoms to at least one internal state |a> and of trapping a cloud of said ultracold atoms in a local potential well, at a distance h from the measurement plane (trap T, curve "a" of FIG. 2 part a)). The height h is different from 0 because the uniform magnetic field 20 is non-zero. Trapping is achieved by passing DC currents through the wire WIz and through one of the wires WIdi, the crossing point of these two wires defining the start point (here C1 with WId1). At the same time, a bias magnetic field 20 is applied parallel to the plane of the atom chip, which field is superposed on the magnetic field created by the preceding two wires. The cloud of atoms is then trapped plumb with C1, the intersection of the wires WIz and WId1.

In a step B0, the internal states are initialized by coherently superposing said ultracold atoms between said states |a> and |b> via a first/2 pulse. This pulse may be produced by a laser, a microwave emitter, or more generally using a method whereby waves are emitted at a suitable transition frequency. Currents $I_z$ and $I_{d1}$ are applied to the conductive wires WIz and WId1, respectively. The two internal states |a> and |b> are superposed coherently and spatially plumb with the crossing point C1.

The wave function is then:

$$\frac{|a>+|b>}{\sqrt{2}} \qquad (2)$$

In a step C0, a cloud of atoms of internal state |a> in one trap T1 is spatially separated from a cloud of atoms of internal state |b> in another trap T2, and the traps are moved in opposite directions along a closed path 16 contained in a plane perpendicular to the measurement axis Z. The cloud of atoms of internal states |a> has been symbolized by a disk of light texture, and the cloud of atoms of internal states |b> has been symbolized by a disk of darker texture. This step runs from $t_1$ to $t_9$.

Between $t_1$ and $t_2$, the microwave power injected into the waveguides CPW1 and CPW2 gradually changes from 0 to its maximum value. An angular frequency $\omega_a$ is sent to the waveguide CPW1 and an angular frequency $\omega_b$ is sent to the waveguide CPW2, this allowing the two clouds of different internal states to be moved either side of the axis of symmetry Y, by a distance d, to the positions schematically shown for $t_2$. The ultracold-atom trap T described above at time $t_1$ is thus converted into two ultracold-atom traps T1 and T2, each trap allowing a cloud of ultracold atoms of internal states different from the other trap to be immobilized (in the present case, internal states |a> in one of the traps, for example T1, and internal states |b> in the other trap T2, as illustrated in part a) of FIG. 2).

A crossing point Ci corresponds to the crossing of the wire WIz with the wire WIdi.

Between $t_2$ and $t_3$, the current $I_{d1}$ is gradually cut and $I_{d2}$ is gradually increased to its maximum value (the time interval separating $t_2$ and $t_3$ is typically of the order of 10 ms and may be comprised between 0.1 ms and 100 ms): the two traps T1 and T2 are moved to the right to the positions schematically shown for $t_3$.

Between $t_3$ and $t_4$, the current $I_{d2}$ is gradually cut and $I_{d3}$ is gradually increased to its maximum value: the two traps are moved to the right to the positions schematically shown for $t_4$.

Between $t_4$ and $t_5$, the microwave power is gradually cut: the two traps are brought back to the same place on the chip, as schematically shown for $t_5$.

At $t_5$, the angular frequencies of the two microwave guides are modified: the angular frequency $\omega_b$ is applied to CPW1 and the angular frequency $\omega_a$ is applied to CPW2.

Between $t_5$ and $t_6$, the power in the two waveguides gradually changes from 0 to its maximum value: the traps are separated in the vertical direction as schematically shown in the figure for $t_6$.

Between $t_6$ and $t_7$, the current $I_{d3}$ is gradually cut and $I_{d2}$ is gradually increased to its maximum value: the two traps T1 and T2 are moved to the left to the positions schematically shown for $t_7$.

Between $t_7$ and $t_8$, the current $I_{d2}$ is gradually cut and $I_{d1}$ is gradually increased to its maximum value: the two traps are moved to the left to the positions schematically shown for $t_8$. This operation may be repeated a number of times with other first conductive wires to increase the area enclosed by the path 16.

Between $t_8$ and $t_9$, the microwave power in the waveguides is gradually cut. The two traps T1 and T2 move until they merge into a single trap located at the start point schematically shown for $t_1$.

DC currents are thus applied to the two wires corresponding to the initial crossing point C1, and over time these currents are successively applied to the various crossing points Ci located on the axis of symmetry, while simultaneously applying microwave power to the waveguides.

During step C0, the DC currents applied to the various wires WIdi vary continuously (increase and decrease) between 0 and a maximum value Idimax (normalized to 1 in FIG. 3), whereas the magnetic field 20 and the current $I_z$ remain constant during the sequence. Throughout the sequence A0, B0 and C0, the two traps T1 and T2 remain at the height h.

The two traps T1 and T2 move in the direction of "turn-on" of the crossing points: from the crossing point C1 to the crossing point Cn. The return trip is made by inverting the microwave frequencies and turning on the DC currents successively in the wires corresponding to the various crossing points Cn to C1.

The traps are thus made to travel the closed path 16.

The closed path 16 of the atoms then contains an area A, and the atom wave function is therefore:

$$\frac{|a> + \exp(i\varphi)|b>}{\sqrt{2}} \quad (3)$$

with:

$$\varphi \omega_0 t + \frac{m}{\hbar} \Omega_Z A \quad (4)$$

In a step D0, the internal states |a> and |b> are recombined by applying a second π/2 pulse to the ultracold atoms, this transferring the phase difference to the populations of the two atomic states:

$$p_a = \tfrac{1}{2}[1+\cos(\varphi-\omega t)] \quad (5)$$

$$p_b = \tfrac{1}{2}[1-\cos(\varphi-\omega t)] \quad (6)$$

where ω is the angular frequency of the π/2 pulse.

The π/2 pulses may be sent to the atoms via the microwave guides or via a separate microwave emitter.

Next, the density of atoms in an internal state chosen from at least |a> and |b> is measured. This measurement may be for example carried out by using laser absorption to probe the resonance between the angular frequency specific to an internal state and the angular frequency of the laser.

Lastly, in a step E0, the Sagnac phase shift of the ultracold atoms is determined and the speed of rotation of the sensor about the Z-axis is computed.

Measurement of at least one population of atoms in one of the states |a> or |b> allows the Sagnac phase shift to be determined, for example for the internal state |a>, using equation (5), then the speed of rotation $\Omega_z$ to be determined using equation (1).

The traps may be made to travel this path N times before the Sagnac phase shift is measured, and thus a phase shift that is potentially N times greater may be measured.

In order to implement the method described above, the ultracold-atom sensor allowing a measurement of speed of rotation $\Omega_z$ comprises:
- an atom chip 1 as described above, with the waveguides and conductive wires,
- an atom source for generating the cloud of ultracold atoms near the measurement plane 13 of the atom chip,
- a generator of the uniform magnetic field 20,
- at least one processor, at least one DC current or voltage generator suitable for controlling the electric currents in the conductive wires and at least one microwave current or voltage generator connected to the waveguides,
- a system for detecting optical intensity that is suitable for measuring at least one population of ultracold atoms in an internal state, this measurement allowing Sagnac phase shift and speed of rotation $\Omega_z$ to be determined.

The sensor described above and in document WO2017089489 allows, on the basis of a path contained in a plane parallel to the measurement plane 13, only a measurement of speed of rotation about the Z-axis perpendicular to the plane of the chip. To be able to measure the speed of rotation about three axes, it is necessary to provide 3 sensors of this type, this being expensive, using up space and complex to do, particularly as regards the respective positions of the three axes (adjustment of their orthogonality), this adjustment exhibiting a drift over time that decreases the accuracy of the assembly.

SUMMARY OF THE INVENTION

One aim of the present invention is to overcome the aforementioned drawbacks by providing an atom chip and sensors based on this chip that are capable of taking a measurement of speed of rotation about two perpendicular axes in the case of a first version of the sensor, and about three perpendicular axes in the case of a second version of the sensor.

One subject of the present invention is an atom chip for an ultracold-atom sensor, said chip comprising an XY-plane normal to a Z-axis, the atom chip comprising:

first and second coplanar waveguides suitable for propagating microwaves at respective angular frequencies $\omega_a$ and $\omega_b$, said waveguides being placed symmetrically on either side of the X-axis, and being referred to as X-wise guides, first and second coplanar waveguides suitable for propagating microwaves at respective angular frequencies $\omega'_a$ and $\omega'_b$, said waveguides being placed symmetrically on either side of an axis the projection of which in the XY-plane is along an axis Y' that is different from the X-axis and that is contained in the XY-plane, and being referred to as Y'-wise guides, the X-wise guides being electrically insulated from the Y'-wise guides, an intersection of said guides forming a parallelogram of center O defining an origin of the reference frame XYZ, at least a first conductive wire and a second conductive wire the respective projections of which in the XY-plane are secant at O and make between them an angle larger than or equal to 20°, said conductive wires being suitable for being passed through by DC currents.

According to one embodiment, the X-wise guides, the Y-wise guides, the first conductive wire and the second conductive wire are each placed on a different level, each level being electrically insulated from the neighboring levels, said levels forming a stack placed on a substrate.

According to one embodiment, the projection in the XY-plane of the first conductive wire is oriented along the X-axis and the projection in the XY-plane of the second conductive wire is oriented along the Y'-axis.

According to one embodiment, the Y'-axis coincides with the Y-axis. According to one embodiment, the Y'-axis coincides with the Y-axis and the respective projections of the first conductive wire and of the second conductive wire in the XY-plane are mutually perpendicular and oriented at 45° from the X- and Y-axes, respectively.

According to one variant, the atom chip further comprises a plurality of conductive wires placed parallel to the first conductive wire, forming a first plurality of conductive wires, and a plurality of conductive wires placed parallel to said second conductive wire, forming a second plurality of conductive wires, a projection in the XY-plane of a wire of the first plurality and of a wire of the second plurality defining a crossing point on the XY-plane, said first and second pluralities of conductive wires being arranged so that at least a set of crossing points is inside said parallelogram.

Preferably, the first plurality and second plurality of conductive wires are configured so that a sub-set of said set of crossing points is located on the X-axis and another sub-set of said set of crossing points is located on the Y'-axis.

According to one embodiment, the conductive wires have a width and a distance between two neighboring conductive wires is comprised between 0.5 times and 2 times said width.

According to one variant, the atom chip according to the invention is a matrix-array atom chip, and in a first embodiment it comprises a first set of first conductive wires indexed n and a second set of second conductive wires indexed m that are mutually perpendicular and that form rows and columns of a matrix array, respectively, each of the first conductive wires indexed n and of the second conductive wires indexed m being coincident with an axis Xn indexed n and with an axis Ym indexed m, respectively, guides along the Xn-axis thus being common to all the pixels of row n and guides along the Ym-axis thus being common to all the pixels of column m, each pixel of the matrix array forming one elementary chip.

According to one variant, the atom chip according to the invention is a matrix-array atom chip, and in a second embodiment it comprises a first set of first conductive wires indexed n and a second set of second conductive wires indexed m that are mutually perpendicular and that form rows and columns of a matrix array, respectively, each of the first conductive wires indexed n and of the second conductive wires indexed m being oriented at 45° from an axis Xk indexed k and at 45° from an axis Yl indexed l, respectively, guides along the Xk-axis thus being common to all the pixels of a first diagonal of the matrix array and guides along the Yl-axis thus being common to all the pixels of a second diagonal, each pixel of the matrix array forming one elementary chip.

According to one embodiment, at least one conductive wire of the first or of the second set is replaced by a plurality of conductive wires that are parallel to one another, a portion of the conductive wires of said plurality being comprised in the associated parallelograms.

The invention also relates to an ultracold-atom sensor allowing a measurement of speed of rotation about at least two axes X and Y', comprising:

an atom chip according to the invention placed in a vacuum chamber, an atom source arranged to generate a cloud of ultracold atoms near said XY-plane of said atom chip, said ultracold atoms having, during the phase of initialization of the implementation of the sensor, a superposition of internal states |a> and |b> a generator of a uniform magnetic field, at least one processor, at least one DC current or voltage generator suitable for controlling electric currents in said conductive wires and at least one microwave current or voltage generator connected to said waveguides, said waveguides, said conductive wires and, where appropriate, the magnetic field being configured, during the implementation of the sensor, to:

modify the energy of said ultracold atoms so as to create a potential well for the ultracold atoms in the internal state |a> and a potential well for the ultracold atoms in the internal state |b>, thus forming a first ultracold-atom trap and a second ultracold-atom trap, one trap making it possible to immobilize a cloud of ultracold atoms in an internal state different from the other trap, at a controlled distance from said measurement plane, and spatially separate the two traps and move said traps along at least a first closed path contained in a plane perpendicular to X and a second closed path contained in a plane perpendicular to Y', each path being travelled in one direction by the ultracold atoms of the first trap and in the opposite direction by the ultracold atoms of the second trap, the sensor further comprising a system for detecting optical intensity, suitable for measuring at least one population of said ultracold atoms in a said internal state.

According to one embodiment, said waveguides and the at least one microwave current or voltage generator, said conductive wires and the at least one DC current or voltage generator, and the generator of the uniform magnetic field, are configured so that the first closed path and second closed path each comprise at least a first portion located at a first height from the XY-plane and a second portion located at a second height strictly larger than the first height, and so as to cause passage from the first height to the second height via:

an increase in the value of the DC current passing through each conductive wire, between a first non-zero value ($I_{W1}'$, $I_{W2}'$) and a second non-zero value ($I_{W1}''$, $I_{W2}''$) and/or a decrease in a value of the uniform magnetic field between a first non-zero value (B0') and a second non-zero value (B0''), and vice versa for passage from the second height to the first height.

According to one variant, the ultracold-atom sensor allows a measurement of speed of rotation about three axes X, Y' and Z, comprising:

an atom chip according to the invention placed in a vacuum chamber, an atom source arranged to generate a cloud of ultracold atoms near said XY-plane of said atom chip, said ultracold atoms having in the initialized state a superposition of internal states |a> and |b>, a generator of a uniform magnetic field, at least one processor, at least one DC current or voltage generator suitable for controlling electric currents in said conductive wires and at least one microwave current or voltage generator connected to said waveguides, said waveguides and said conductive wires being configured to:

modify the energy of said ultracold atoms so as to create a potential well for the ultracold atoms in the internal state |a> and a potential well for the ultracold atoms in the internal state |b>, thus forming a first ultracold-atom trap and a second ultracold-atom trap, one trap making it possible to immobilize a cloud of ultracold atoms in an internal state different from the other trap, at a controlled distance from said measurement plane, and spatially separate the two traps and move said traps along a first closed path contained in a plane perpendicular to X and initialized from a first initialization crossing point located on the X-axis, a second closed path contained in a plane perpendicular to Y' and initialized from a second initialization crossing point located on the Y'-axis, and a third closed path contained in a plane perpendicular to Z and initialized from a third initialization crossing point located at point O, each path being travelled in one direction by the ultracold atoms of the first trap and in the opposite direction by the ultracold atoms of the second trap, the sensor further comprising a system for detecting optical intensity, suitable for measuring at least one population of said ultracold atoms in a said internal state.

According to one embodiment, said waveguides and the at least one microwave current or voltage generator, said conductive wires and the at least one DC current or voltage generator, and the generator of the uniform magnetic field, are configured so that the first and second closed paths each comprise at least a first portion located at a first height (h1) from the XY-plane and a second portion located at a second height (h2) strictly larger than the first height, and so as to cause passage from the first height to the second height via:

an increase in a value of the DC current passing through each conductive wire defining the associated initialization crossing point, between a first non-zero value and a second non-zero value and/or a decrease in a value of the uniform magnetic field between a first non-zero value and a second non-zero value, and vice versa for passage from the second height to the first height.

According to one variant, the ultracold-atom sensor comprises:

a matrix-array atom chip according to the invention, an atom source arranged to generate a cloud of ultracold atoms near said XY-plane of said atom chip, a generator of a uniform magnetic field, at least one processor, at least one DC current or voltage generator suitable for controlling electric currents in said conductive wires and at least one microwave current or voltage generator connected to said waveguides, a system for detecting optical intensity, the sensor being suitable for measuring, as required and in a reconfigurable manner, at least one acceleration and/or a speed of rotation along/about at least one direction corresponding to that of the axes Xn and/or the axes Ym, using said elementary chips.

According to another aspect, the invention relates to a method for measuring a speed of rotation about two axes X and Y' using an ultracold-atom sensor comprising an atom chip, said atom chip being placed in a vacuum chamber and comprising an XY-plane normal to a Z-axis, the atom chip comprising:

first and second waveguides suitable for propagating microwaves at respective angular frequencies $\omega_a$ and $\omega_b$, said waveguides being placed symmetrically on either side of the X-axis, and being referred to as X-wise guides, first and second waveguides suitable for propagating microwaves at respective angular frequencies $\omega'_a$ and $\omega'_b$, said waveguides being placed symmetrically on either side of an axis the projection of which in the XY-plane is along an axis Y' that is contained in the XY-plane, and being referred to as Y'-wise guides, the X-wise guides being electrically insulated from the Y'-wise guides, an intersection of said guides forming a parallelogram of center O defining an origin of the reference frame XYZ, at least a first conductive wire W1 and a second conductive wire W2 the respective projections of which in the XY-plane are secant at the point O and make between them an angle larger than or equal to 20°, said conductive wires being suitable for being passed through by DC currents, the method comprising, to measure the speed of rotation about one of the axes X and Y', which axis is referred to as the measurement axis, the steps of:

A generating a cloud of said ultracold atoms, this including phases of dispensing said atoms, of cooling said atoms, of initializing said atoms to at least one internal state |a> and of trapping a cloud of said ultracold atoms in a local potential well, at a first height from said XY-plane, said trapping being carried out by passing DC currents through the first and second conductive wires, B initializing the internal states by coherently superposing said ultracold atoms between said states |a> and |b> via a first π/2 pulse, C spatially separating a cloud of said atoms of said internal state |a> in one trap from a cloud of said atoms of said internal state |b> in another trap, and moving said traps in opposite directions along a closed path contained in a plane perpendicular to the measurement axis and initialized from the point O, by applying a voltage or a current at predetermined microwave frequencies to said first and second guides along the measurement axis, by applying at least two different DC current or voltage values to the first and second conductive wires and/or by applying at least two different values of a uniform magnetic field, in a predetermined sequence, said path comprising a portion located at a second height from the XY-plane different from the first height, D recombining said internal states |a> and |b> by applying to said ultracold atoms a second π/2 pulse then measuring the density of atoms in an internal state chosen from at least |a> and |b>, E determining the Sagnac phase shift of said ultracold atoms and computing the speed of rotation of said sensor about said measurement axis, the method further comprising implementing steps A to E to measure the speed of rotation about the other measurement axis.

According to one variant, the method according to the invention measures a speed of rotation about three axes X, Y' and Z using a cold-atom sensor comprising an atom chip, said atom chip being placed in a vacuum chamber and comprising an XY-plane normal to a Z-axis, the axes XYZ forming an orthonormal reference frame, the atom chip comprising:

first and second waveguides suitable for propagating microwaves at respective angular frequencies $\omega_a$ and $\omega_b$, said waveguides being placed symmetrically on either side of the X-axis, and being referred to as X-wise guides, first and second waveguides suitable for propagating microwaves at respective angular frequencies $\omega'_a$ and $\omega'_b$, said waveguides being placed symmetrically on either side of an axis the projection of which in the XY-plane is along an axis Y' that is contained in the XY-plane, and being referred to as Y'-wise guides, the X-wise guides being electrically insulated from the Y'-wise guides, an intersection of said guides forming a parallelogram of center O defining an origin of the reference frame XYZ, a first plurality of mutually parallel conductive wires and a second plurality of mutually parallel conductive wires, a projection in the XY-plane of a wire of the first plurality and of a wire of the second plurality of conductive wires defining a crossing point, a projection in the XY-plane of said pluralities making between them an angle larger than or equal to 20°, a projection in the XY-plane of a wire of the first plurality and of a wire of the second plurality of conductive wires being secant at the point O, said first and second pluralities of conductive wires being arranged so that at least a set of the crossing points is inside said parallelogram, the method comprising:

implementing steps A to E of the method such as described above to measure speeds of rotation about X, the first closed path, contained in a plane perpendicular to X, being initialized from a first initialization crossing point located on the X-axis, implementing steps A to E of the method such as described above to measure speeds of rotation about Y', the second closed path, contained in a plane perpendicular to Y', being initialized from a second initialization crossing point located on the Y'-axis, and to measure the speed of rotation about the Z-axis, corresponding to the measurement axis:

implementing steps A and B of the method such as described above, a step C' consisting in spatially separating a cloud of said atoms of said internal state |a> in one trap from a cloud of said atoms of said internal state |b> in another trap, and moving said traps in opposite directions along a closed path contained in a plane perpendicular to the Z-axis and initialized from a third initialization crossing point, by applying a voltage or a current at predetermined microwave frequencies to said first and second guides along one of the axes X and Y', which axis is referred to as the chosen axis, and by applying a DC current or voltage to the conductive wires of the first and of the second plurality of conductive wires in a predetermined sequence, so as to successively excite crossing points placed on or in the vicinity of the chosen axis, implementing steps D and E.

The following description presents a number of exemplary embodiments of the device of the invention: these examples do not limit the scope of the invention. These exemplary embodiments contain not just the essential features of the invention but also additional features related to the embodiments in question.

BRIEF DESCRIPTION OF THE DRAWINGS

The invention will be better understood and other features, aims and advantages thereof will become apparent from the detailed description that follows and that is given with reference to the appended drawings, which are given by way of non-limiting examples and in which.

DETAILED DESCRIPTION

Figure 4:
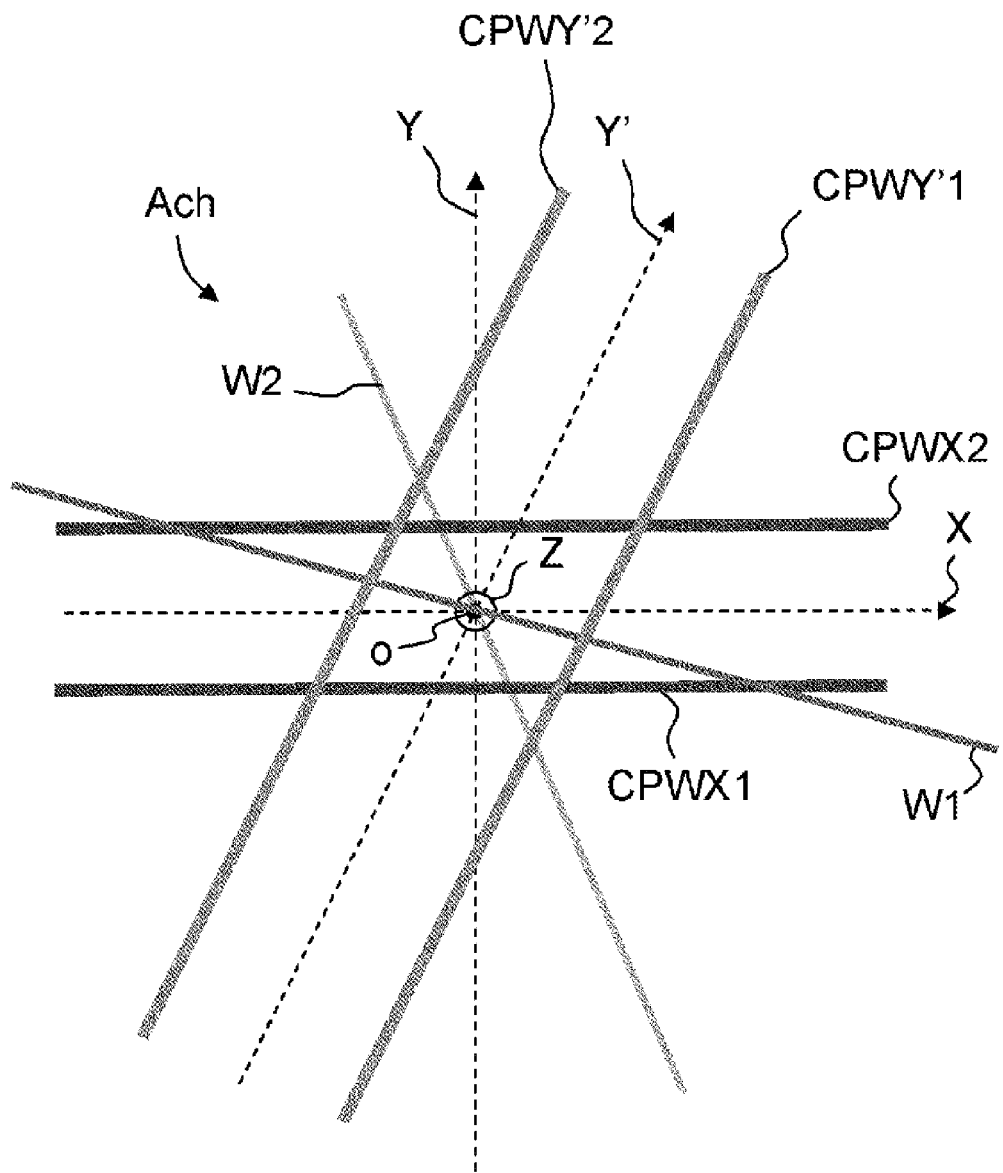
FIG. 4 illustrates an atom chip according to a first aspect of the invention for an ultracold-atom sensor.

According to a first aspect, the invention relates to an atom chip Ach such as illustrated in FIG. 4 for an ultracold-atom sensor. The surface of the atom chip defines an XY-plane, normal to a Z-axis.

The atom chip comprises a first waveguide CPWX1 and a second waveguide CPWX2 that are coplanar and that are suitable for propagating microwaves at respective angular frequencies $\omega_a$ and $\omega_b$, said waveguides being placed symmetrically on either side of the X-axis. These two guides are referred to as X-wise guides.

The atom chip also comprises a first waveguide CPWY'1 and a second waveguide CPWY'2 that are coplanar and that are suitable for propagating microwaves at respective angular frequencies $\omega'_a$ and $\omega'_b$, said waveguides being placed symmetrically on either side of an axis the projection of which in the XY-plane (which is perpendicular to the Z-axis) is along an axis Y' that is contained in the XY-plane. These two guides are referred to as Y'-wise guides.

The X-wise guides are electrically insulated from the Y'-wise guides. Preferably they are placed on a different level (see FIG. 5). Thus on the non-limiting assumption that the X-wise guides occupy the level corresponding to the surface, the axis of symmetry of the two waveguides CPWY'1 and CPWY'2 is located in the plane of another level, and thus it is indeed the projection of this axis of symmetry in the XY-plane, called Y', that is located in the XY-plane. Since the Y'-axis is different from X, the two sets of guides define an intersection that forms a parallelogram of center O. This point O defines an origin of the reference frame XYZ. Below, for the sake of clarity, the geometric characteristics of the various elements of interest have been defined with respect to the reference frame OXYZ. The XY-plane is also referred to as the horizontal plane.

The atom chip Ach also comprises at least a first conductive wire W1 and a second conductive wire W2 that are able to be passed through by DC currents. Furthermore, the respective projections in the XY-plane of W1 and W2 are secant at O and make between them an angle larger than or equal to 20°. For greater clarity, the wires and the Y'-wise waveguides have been shown in the XY-plane in all the figures.

Figure 5:
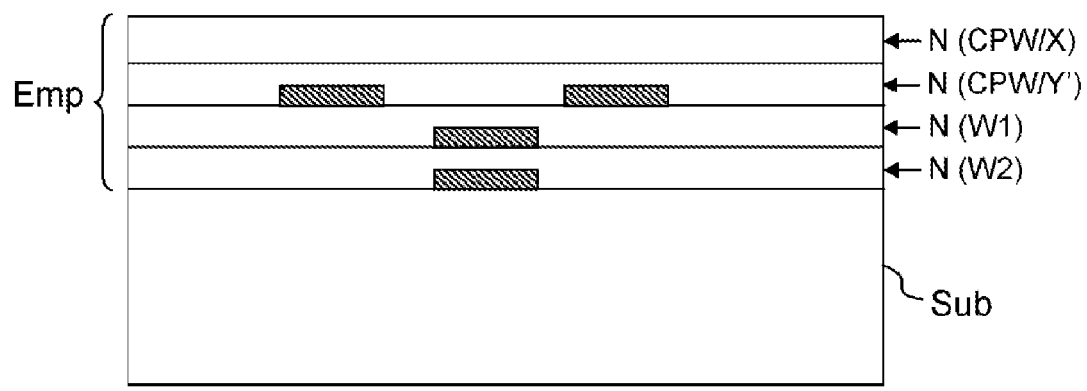
FIG. 5 illustrates in cross section through the OXZ plane one preferred embodiment of the atom chip along the Z-axis.

FIG. 5 illustrates in cross section through the OXZ plane one preferred embodiment of the atom chip along the Z-axis. The two wires W1 and W2 may be on the same level or be electrically insulated from each other. In the latter case, the two wires W1 and W2 then occupy two different levels, just like the waveguides. Thus, according to one embodiment, the X-wise waveguides CPWX1 and CPWX2, the Y-wise guides CPWY'1 and CPWY'2, the first conductive wire W1 and the second conductive wire W2 are each placed on a different level, each level being electrically insulated from neighboring levels: one level N(CPW/X) for the X-wise guides, one level N(CPW/Y') for the Y'-wise guides, one level N(W1) for the first conductive wire and one level N(W2) for the second conductive wire. The 4 levels form a stack Emp placed on a substrate Sub. The waveguides and conductive wires are similar in nature to those described in document WO2017089489. Typically the wires and the guides are made of gold or of copper, and insulated by a layer of a material chosen from AlN, $SiO_2$, and $Si_3N_4$, the layers being deposited on a substrate Sub made of AlN, or of silicon, or of $SiO_2$, or of SiC.

Figure 6:
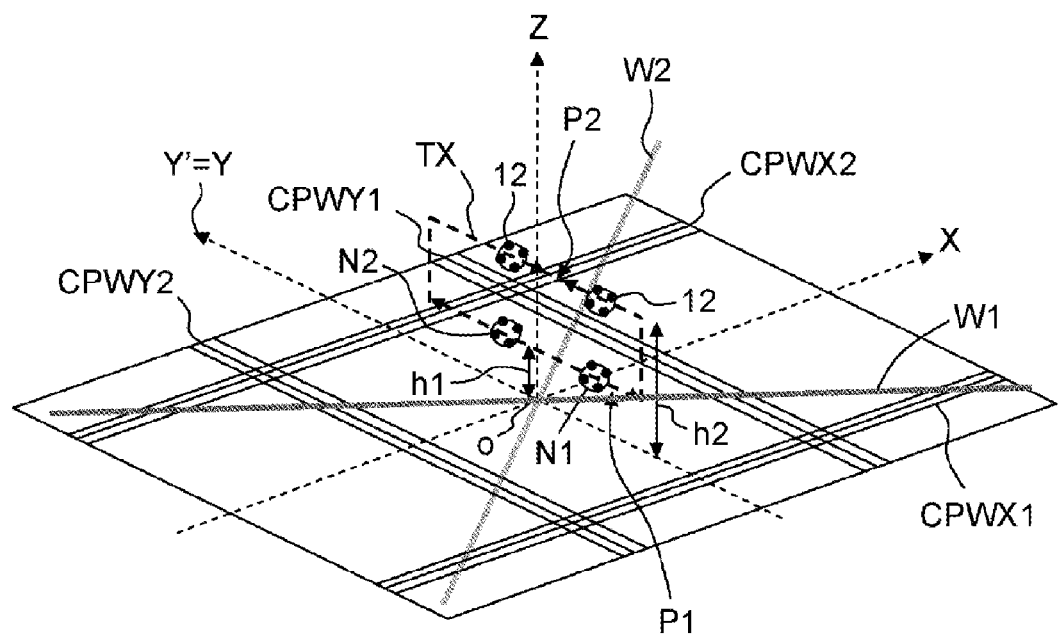
FIG. 6 illustrates a closed path, obtained with an atom chip according to the invention, of two clouds of atoms in a plane containing Z.

The atom chip Ach differs from the chip described in the document WO2017089489 on the one hand in the presence of 4 waveguides (instead of two), in the number of wires (only 2) and in the specific arrangement of these two conductive wires with respect to the 4 waveguides. It will be shown below how this original geometry makes it possible, when the chip is integrated into an inertial sensor, to produce two closed paths TX and TY' that are intended to be travelled by two clouds N1 and N2 of cold atoms 12, these paths not being contained in a plane parallel to the XY-plane, as in the aforementioned document, but in two planes that are perpendicular to XY or vertical, the YZ-plane perpendicular to X for TX (such as illustrated in FIG. 6) and the XZ-plane perpendicular to Y' for TY'.

Production of these two paths thus allows a sensor incorporating a chip Ach to measure two speeds of rotation Ωx and Ωy' with respect to the axes X and Y', respectively (see below).

FIGS. 7 to 10 illustrate, non-limitingly, various variants of arrangement of the waveguides and of the wires.

Figure 7:
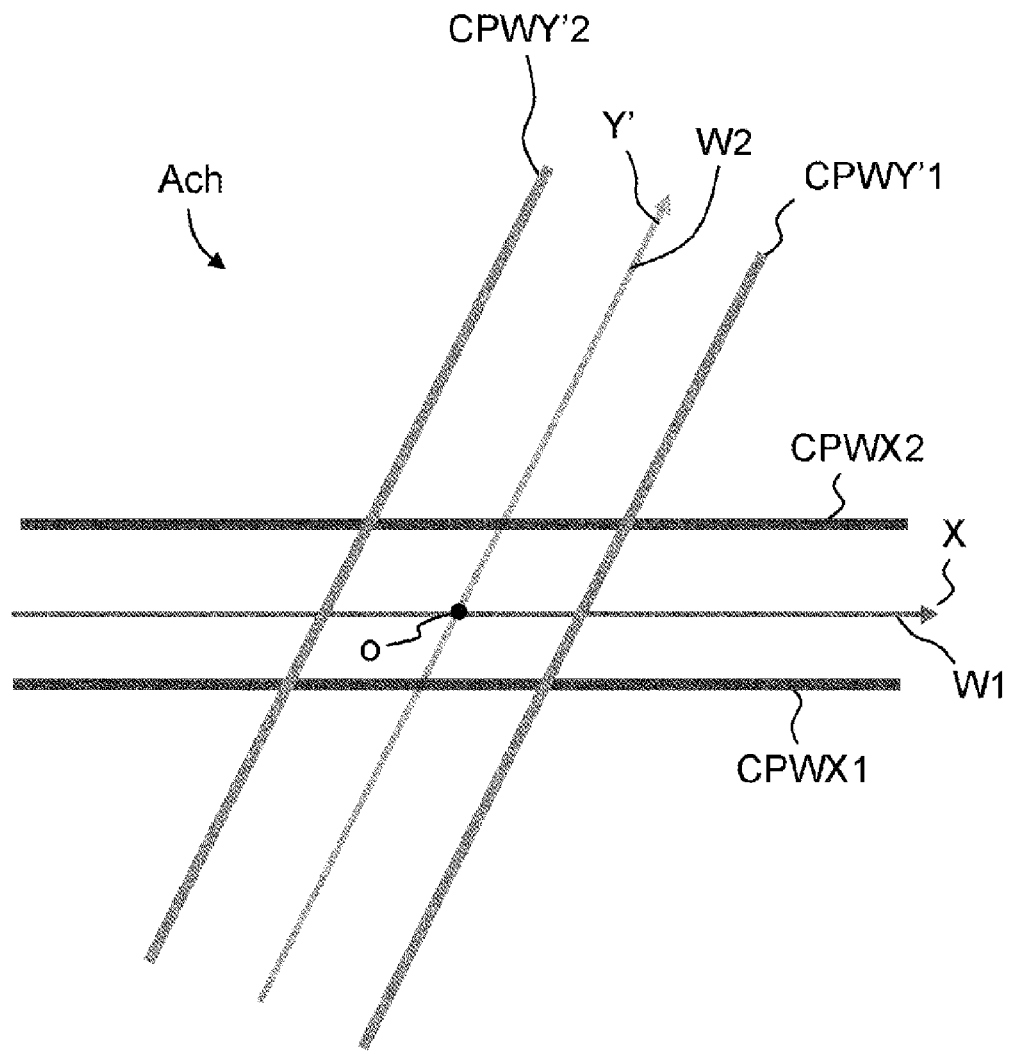
FIG. 7 illustrates a first variant of arrangement of the waveguides and wires, in which variant the projection in the XY-plane of the first conductive wire W1 is oriented along the X-axis and the projection in the XY-plane of the second conductive wire W2 is oriented along the Y'-axis.

According to a first variant illustrated in FIG. 7, the projection in the XY-plane of the first conductive wire W1 is oriented along the X-axis and the projection in the XY-plane of the second conductive wire W2 is oriented along the Y'-axis.

Figure 8:
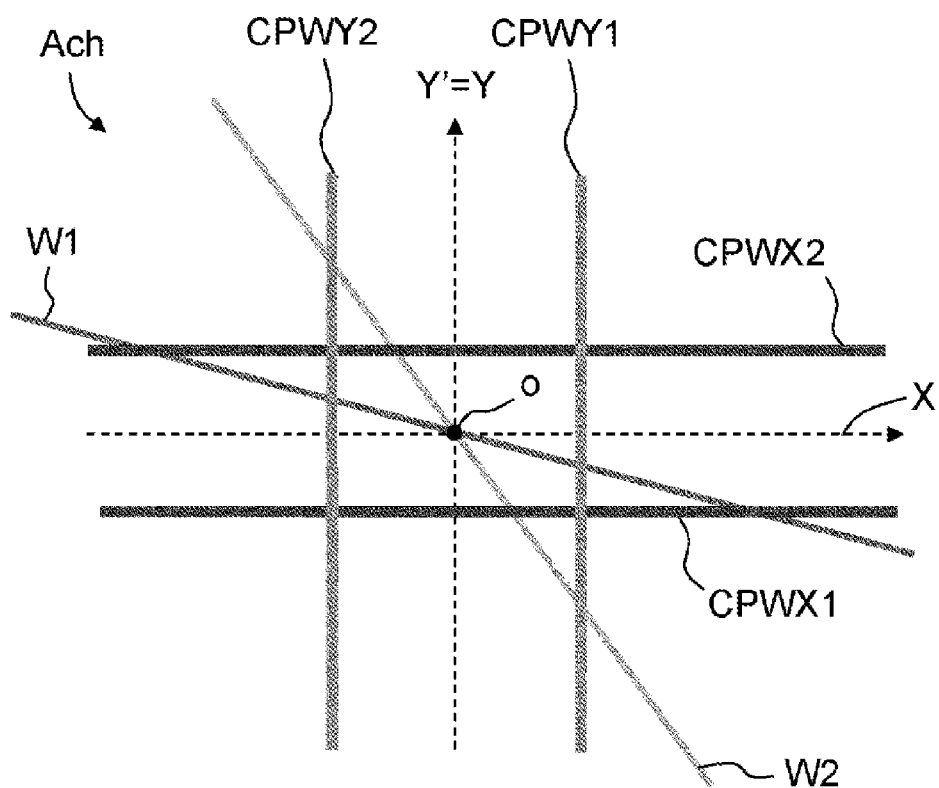
FIG. 8 illustrates a second variant in which the Y'-axis is coincident with the Y-axis.

According to a second variant, the Y'-axis is coincident with the Y-axis, such as illustrated in FIG. 8. The two guide assemblies are then mutually perpendicular, this allowing a measurement of the speed of rotation about two mutually perpendicular axes, this often being desirable.

Figure 9:
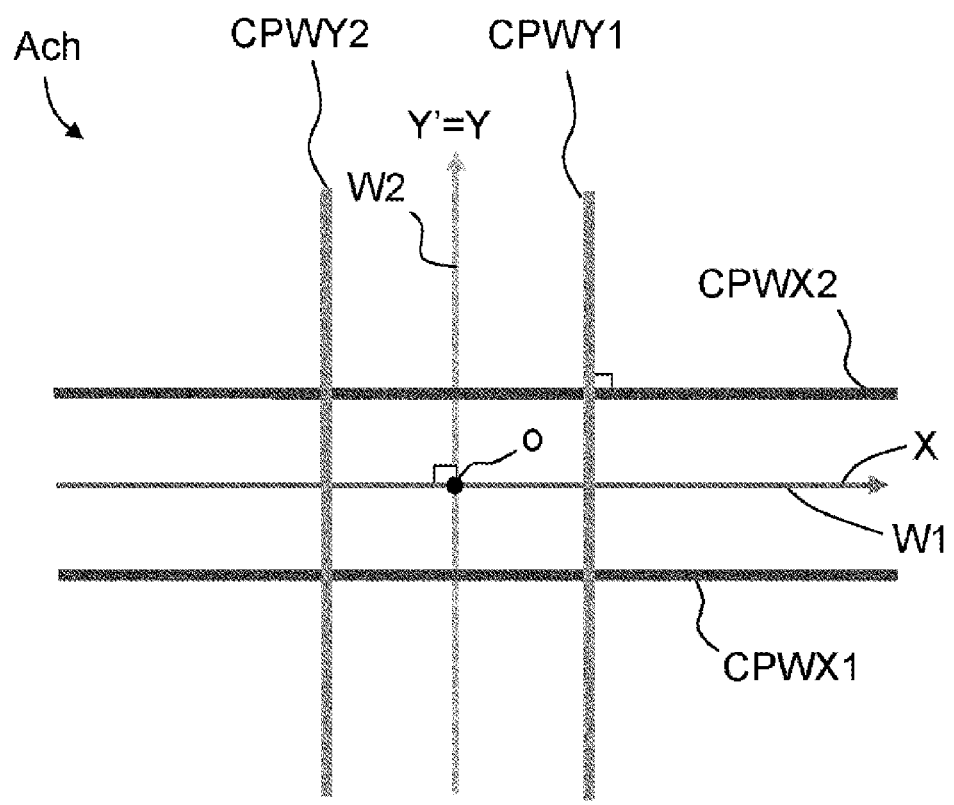
FIG. 9 illustrates the combination of the first and second variants.

FIG. 9 illustrates the combination of the first and second variants.

Figure 10:
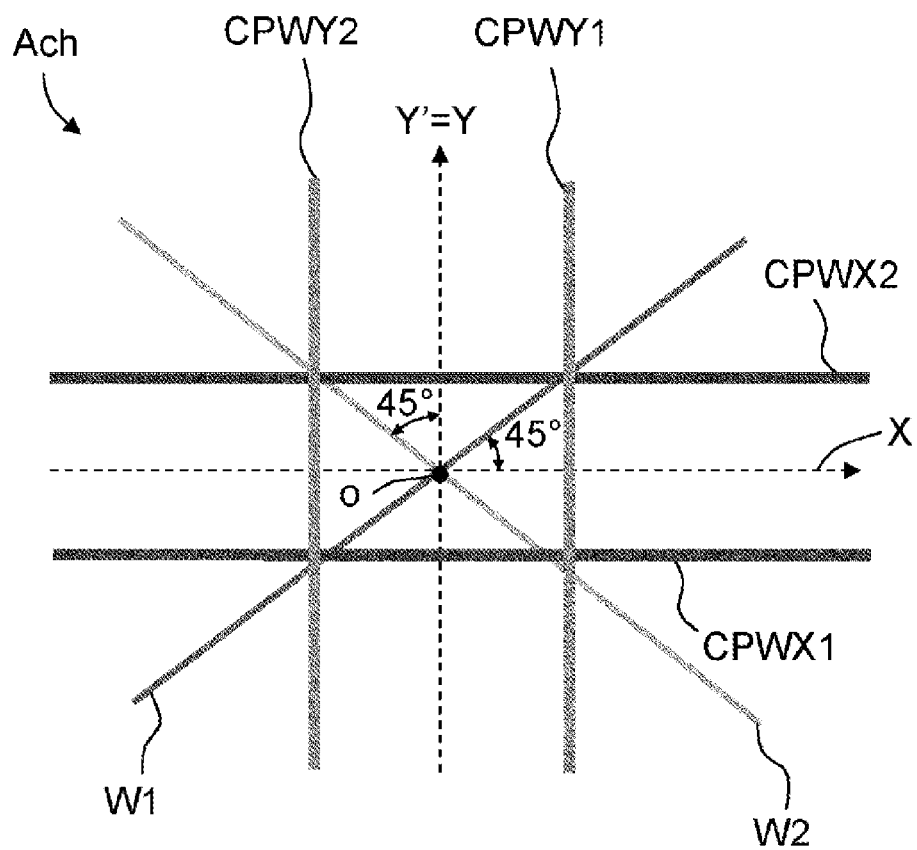
FIG. 10 illustrates a third variant in which the Y'-axis coincides with the Y-axis and the respective projections of the first conductive wire and of the second conductive wire in the XY-plane are mutually perpendicular and oriented at 45° from the X- and Y-axes, respectively.

According to a third variant illustrated in FIG. 10, the Y'-axis is coincident with the Y-axis and the respective projections of the first conductive wire and of the second conductive wire in the XY-plane are mutually perpendicular, and oriented at 45° from the X- and Y-axes, respectively. This third variant has the advantage that it is possible to orient the axes specific to the traps perpendicular to the guides.

Figure 11:
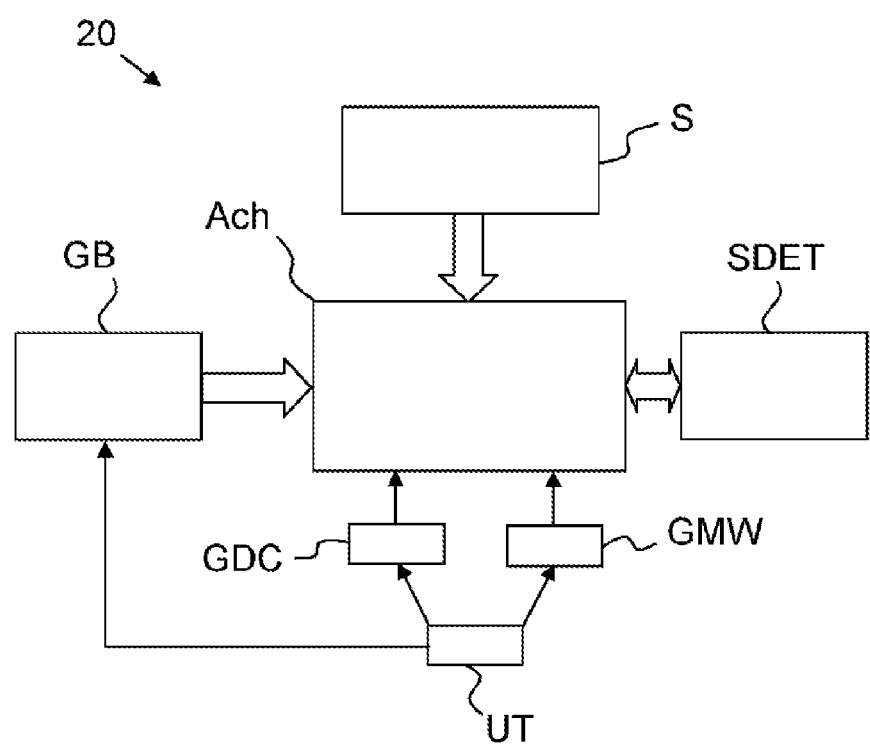
FIG. 11 illustrates an ultracold-atom sensor allowing a measurement of speed of rotation about at least two axes X and Y' according to another aspect of the invention.

According to another aspect, the invention relates to an ultracold-atom sensor 20, such as illustrated in FIG. 11, allowing a measurement of speed of rotation about at least two axes X and Y'.

The sensor comprises an atom chip Ach such as described above placed in a vacuum chamber and an atom source S arranged to generate a cloud of ultracold atoms 12 near the XY-plane of the atom chip Ach. The ultracold atoms have, during the phase of initialization of the implementation of the sensor, a superposition of internal states |a> and |b>.

The sensor 20 also comprises a generator GB of a uniform magnetic field B0, preferably parallel to the plane of the chip, at least one processor UT, at least one DC current or voltage generator GDC suitable for controlling the electric currents in said conductive wires and at least one microwave current or voltage generator GMW connected to said waveguides. Typically there may be one generator GMW for all 4 guides, or 2 generators (1 for each pair of guides) or 4 generators (1 per guide). The X-wise and Y'-wise waveguides, the conductive wires W1 and W2, and where appropriate the magnetic field, are configured to carry out the following steps during the implementation of the sensor:

First, the energy of the ultracold atoms is modified so as to create a potential well for the ultracold atoms in the internal state |a> and a potential well for the ultracold atoms in the internal state |b>, thus forming a first ultracold-atom trap T1 and a second ultracold-atom trap T2, one trap making it possible to immobilize a cloud of ultracold atoms 12 in an internal state different from the other trap, at a controlled distance from the measurement plane (idem steps A0 and B0).

Next, the two traps T1 and T2 are spatially separated and moved along a first closed path TX contained in a plane perpendicular to X and a second closed path TY' contained in a plane perpendicular to Y'.

Each path is travelled in one direction by the ultracold atoms of the first trap and in the opposite direction by the ultracold atoms of the second trap.

The sensor also comprises a system SDET for detecting optical intensity, suitable for measuring at least one population of ultracold atoms in one of the internal states.

To measure the speed of rotation Ωx about the X-axis, it is the path TX that is generated via the waveguides, the conductive wires and the field B0. Likewise, to measure the speed of rotation Sty' about the Y'-axis, it is the path TY' that is generated via the waveguides, the conductive wires and the field B0.

The traps are separated in the same way as in document WO2017089489, but then the paths followed by the clouds N1 and N2 of atoms trapped in the traps T1 and T2, respectively, are different. It is no longer a question here of describing a path in a horizontal plane, but rather of describing a path in a vertical plane as explained above. The inventors have developed a way of achieving such a path, by modifying the height at which the clouds are trapped.

Figure 12:
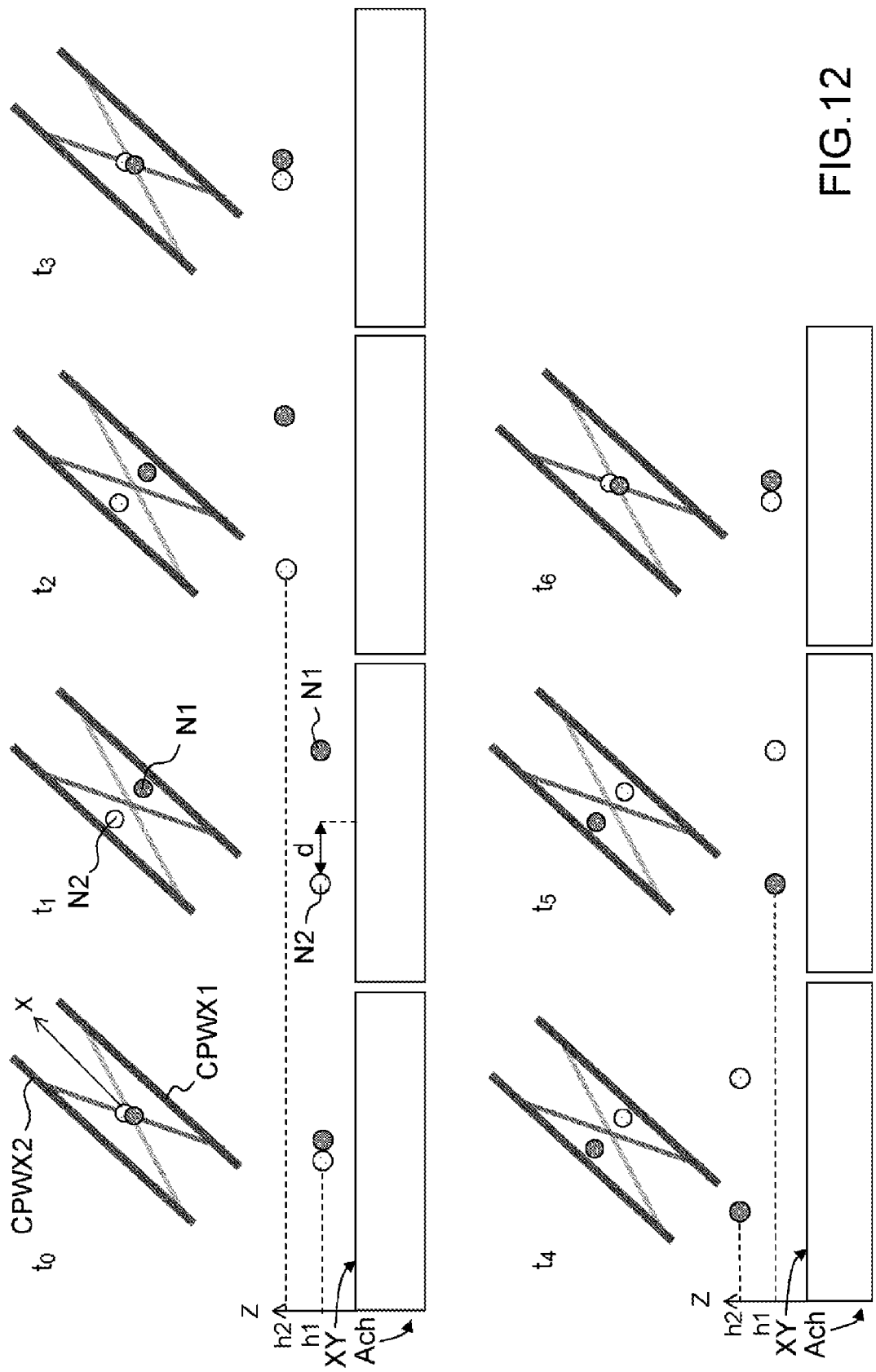
FIG. 12 illustrates the route followed by the two clouds of atoms at a number of times to form a closed loop, in the example of the path TX.

FIG. 12 illustrates the route followed by the two clouds N1 and N2 of atoms at a number of times t0 to t6 to form a closed loop, in the example of the path TX. For greater clarity, only the waveguides CPWX1 and CPWX2 used to produce the path TX have been shown. For each time, the upper part of the associated figure illustrates the position of the two clouds in the XY-plane and the lower part illustrates the position of the two clouds in profile view.

Figure 13:
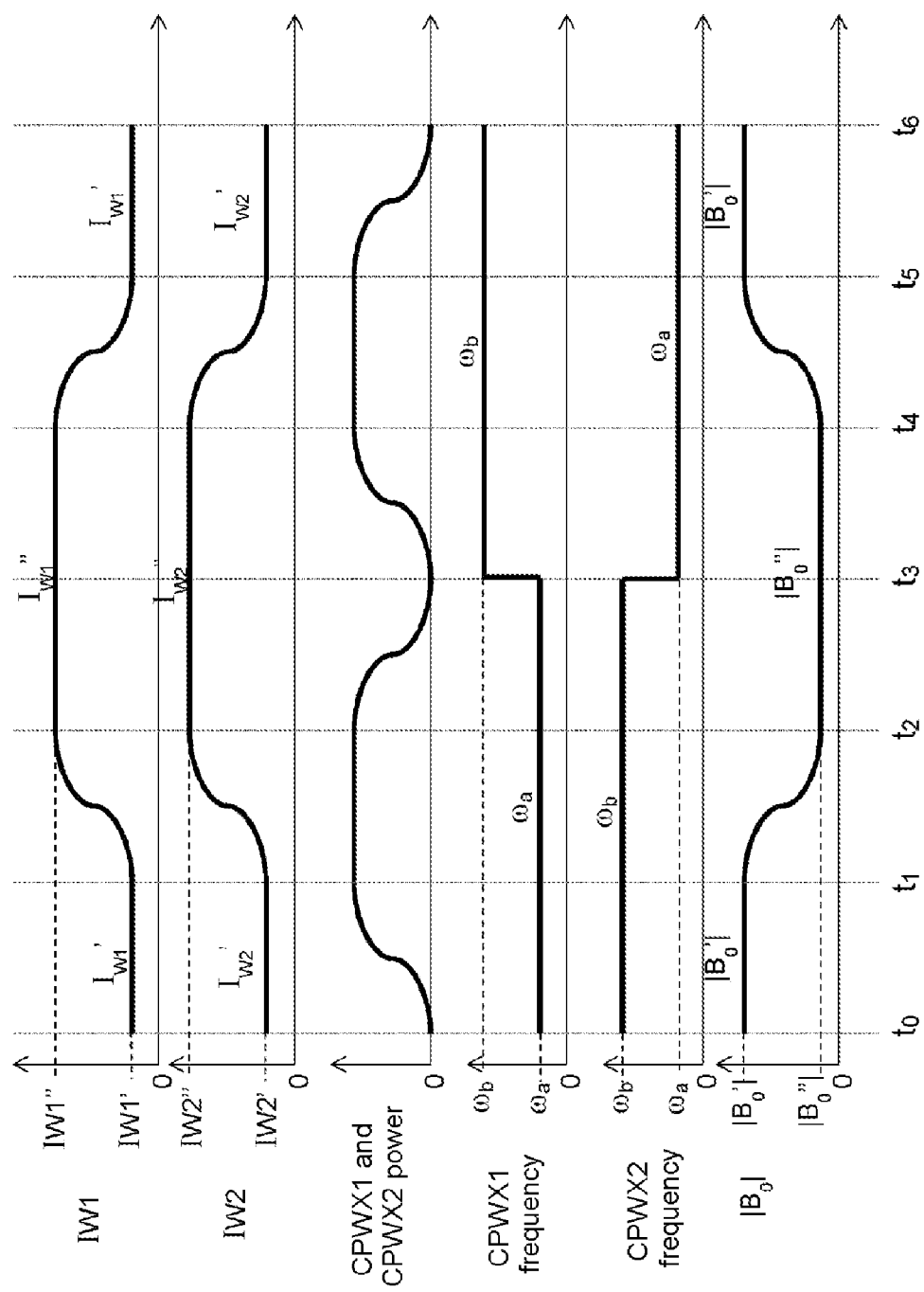
FIG. 13 illustrates the timing diagram of the currents applied to the two conductive wires, of the power and frequency applied to the microwave guides and of the value of the uniform magnetic field B0 over the period of time between the first and last of the preceding times.

FIG. 13 illustrates the timing diagram of the currents applied to the two conductive wires, of the power and frequency applied to the microwave guides and of the value of the uniform magnetic field B0 over the period of time between t0 and t6.

Figure 3:
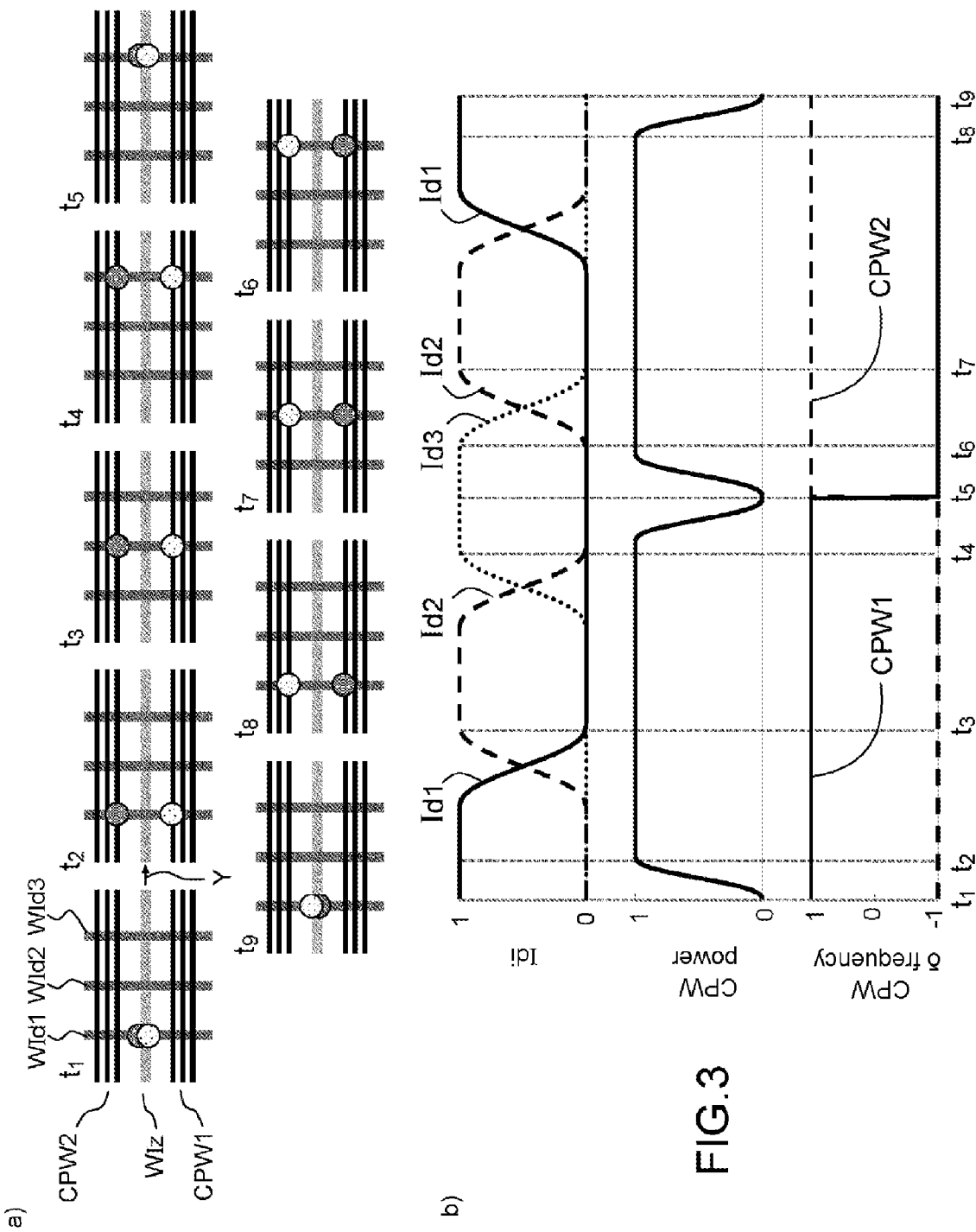
FIG. 3 (already cited) illustrates the principle of generation of the path of the clouds of atoms on the atom chip.

Initially at t0 a current Iw1 of value Iw1' is applied to wire W1, a current Iw1 of value Iw2' is applied to wire W2 and no microwave power is applied, the magnetic field B0 having an absolute value |B0'|. The two traps are not yet separated and the cloud is located above the intersection of the two wires, i.e. above the point O, at a first height h1 from the XY-plane. This start point is identical to the start point t1 of FIG. 3.

At t1, the two clouds are separated and moved apart by a distance d from the X-axis, by applying microwave power to the two guides, at a frequency ωa in the case of CPWX1 and ωb in the case of CPWX2. A first portion of the path TX is travelled at a height h1 by the atoms (see also FIG. 6). This portion of the path is substantially identical to the portion travelled at time t2 in FIG. 3.

Next, the atoms are brought to a second height h2 at t2 (here in the example h1<h2) by modifying the value of the current flowing through the wires and/or by modifying the value of the field B0. A substantially vertical portion of the path is then travelled, over a distance w=h2−h1.

To reach a height larger than the initial height, it is necessary to increase from |w1'| to Iw1" (Iw1'<Iw1") the value of the current flowing through W1 and to increase from Iw2' to Iw2" (Iw2'<Iw2") the value of the current flowing through W2. A similar effect is obtained by decreasing the value of the magnetic field B0 from |B0'| to |B0"| (|B0'|>|B0"|). By using both modifications conjointly, as in the example of FIG. 13, the value of the final height reached is increased. Calculation of the magnetic field generated by the structure makes it possible to establish that the distance of the trap to the XY-plane is approximately proportional to Iw1+Iw2 and inversely proportional to |B0|.

In the example a height h2>h1 is reached. Because of the gap between the two clouds and the XY-plane, the two clouds do not necessarily remain a distance of 2d apart as they pass from h1 to h2, this distance tending to change as the gap between the two clouds and the plane increases. Thus the path may be substantially parallelogram-shaped rather than rectangle-shaped.

At t3, the two clouds, still at the height h2, are returned to the X-axis by gradually decreasing to zero the power applied to the waveguides, the clouds then travelling, at the height h2, substantially horizontally, a second portion of the path. The other part of the second portion at h2 of the path, on the other side of the X-axis (t4, t5), is obtained by inverting the values of the frequencies of the microwaves applied to the guides CPWX1 and CPWX2. At t5, the height h1 is returned to by returning the currents flowing through the conductive wires to the initial values Iw1' (in the case of W1) and Iw2' (in the case of W2) and by returning the magnetic field to its initial value (|B0'|). Lastly, at t6, the microwave power applied to the guides is decreased to zero and the two clouds meet.

Similarly, a path TY' is travelled by "turning on" the waveguides CPWY1 and CPWY2 instead of the guides CPWX1 and CPWX2. The values $\omega'_a$ and $\omega'_b$ of the frequencies of the guides may be identical to or different from the values $\omega_a$ and $\omega_b$.

To measure speeds of rotation $\Omega x$ and $\Omega y'$ about the axes X and Y' with the sensor 20, the clouds of trapped ultracold atoms must travel the path TX at least once (at least 1 lap, though it is also possible for N laps to be made) and the path TY' at least once (at least 1 lap, though it is also possible for M laps to be made), respectively. These two paths are travelled successively in time. The start point of the path, here O, is referred to as the initialization crossing point.

Thus, in the two-axis inertial sensor 10 according to the invention, the waveguides CPWX1, CPWX2, CPWY1, CPWY2, the at least one microwave current or voltage generator GMW, the conductive wires W1, W2, the at least one DC current or voltage generator GDC and the generator GB of the uniform magnetic field, are configured, via at least one processor UT, so that the first closed path TX and the second closed path TY' (which paths are contained in a plane perpendicular to X and in a plane perpendicular to Y', respectively) comprise at least a first portion located at a first height h1 from the XY-plane and a second portion located at a second height h2, with h2>h1, and so that passage from h1 to h2 is achieved via:

an increase in a value of the DC current passing through each conductive wire, between a first non-zero value ($I_{W1}$' in the case of W1, $I_{W2}$' in the case of W2) and a second non-zero value ($I_{W1}$" in the case of W1, $I_{W2}$" in the case of W2), respectively, and/or, a decrease in a value of the uniform magnetic field between a first non-zero absolute value |B0'| and a second non-zero value |B0"|.

Conversely, the first values are passed to from the second values to pass from the second height h2 to the first height h1.

The sensor according to the invention allows problems with axis alignment to be decreased because, in a given chip, the orthogonality of the measurement axes is determined directly by the geometry of the wires of the atom chip. The microelectronic processes used in atom-chip fabrication allow the desired wire geometry to be produced very accurately and therefore the orthogonality of the axes of the sensor to be controlled.

According to another aspect, the invention relates to a method 100 for measuring a speed of rotation about two axes X and Y' using an ultracold-atom sensor comprising an atom chip such as described above.

The method described below makes it possible to measure the speed of rotation about one of the axes X and Y', which axis is referred to as the measurement axis. To perform a measurement about both axes, the method is then also implemented for the other measurement axis.

In one step A a cloud of ultracold atoms 12 is generated, this generation including phases of dispensing and cooling atoms, of initializing the atoms to at least one internal state |a> and of trapping a cloud of ultracold atoms in a local potential well, at a first height h1 from the XY-plane. Trapping is achieved by passing DC currents through the first and second conductive wires. This step is identical to step A0 described with respect to the prior art. The atoms are trapped at the height h1 above the point O, crossing point between the wires W1 and W2.

In a step B, the internal states are initialized by coherently superposing the ultracold atoms in the states |a> and |b> via a first π/2 pulse. This step is identical to step B0 described with respect to the prior art. The two internal states |a> and |b> are superposed coherently and spatially plumb with the point O.

In a step C first of all a cloud of atoms of internal state |a> in one trap T1 is spatially separated from a cloud of atoms of internal state |b> in another trap T2, identically to the prior art. Next, the traps are moved in opposite directions along a closed path that is contained in a plane perpendicular to the measurement axis and that is initialized plumb with the point O. Here the path lies in a vertical plane, perpendicular to X or Y', contrary to the prior art in which the path lies in a plane parallel to the XY-plane. The path TX or TY' comprises a first portion P1 substantially parallel to XY and at a height h1, and a second portion P2 also substantially parallel to XY but at a second height h2 different from h1 (see FIG. 6). The closed path contains an area A1 (TX) or A2 (TY'), the atomic function is therefore:

$$\frac{|a> + \exp(i\varphi)|b>}{\sqrt{2}} \tag{7}$$

with (for A1)

$$\varphi = \omega_0 t + \frac{m}{\hbar}\Omega_X A_1 \tag{8}$$

The clouds of trapped atoms are made to travel the path including the change in height by applying a voltage or a current at predetermined microwave frequencies to the first and second guides along the measurement axis (to separate the traps), by alternating the microwave frequencies to invert the two clouds, by applying at least two different values of DC current or voltage to the first and second conductive wires (non-zero values) and/or by applying at least two different values of a uniform magnetic field, the various changes being made in a predetermined sequence, as illustrated in FIGS. 11 and 12.

It is not a question here of making clouds of trapped atoms travel a path parallel to the XY-plane at constant height, by successively "turning on" the crossing points, as described in step C0 of the prior art. Here, there is only one crossing point, O, and the path is travelled at two different heights.

Once each cloud has traveled the closed path at least once, in a step D the internal states |a> and |b> are recombined by applying a second π/2 pulse to the ultracold atoms, then the density of atoms in an internal state chosen from |a> or |b> is measured (idem for the prior art).

Lastly, in a step E, the Sagnac phase shift of the ultracold atoms and the speed of rotation of the sensor about the measurement axis, here X or Y', are determined using formula (8).

According to one embodiment, the sensor 20 is configured to also carry out a clock measurement. To do this, steps A, B, D and E are implemented. Step C is replaced by a step CHor in which the powers in the waveguides remain zero and the currents in the wires W1 and W2 remain constant. At the end of the step CHor, the wave function is:

$$\frac{|a> + \exp(i\varphi)|b>}{\sqrt{2}}$$

with:

$$\varphi = \omega_0 t$$

During the step CHor, the oscillator that produces the π/2 pulses accumulates a phase ωt where ω/2π is the frequency of the oscillator.

Next, in a step similar to step D, a second π/2 pulse transfers the phase difference to the populations of the two atomic states:

$$p_a = \tfrac{1}{2}[1+\cos(\varphi-\omega t)]$$

$$p_b = \tfrac{1}{2}[1-\cos(\varphi-\omega t)]$$

Step E allows at least one of the two populations to be measured, this allowing the difference between the frequency reference $\omega_0/2\pi$ given by the atoms and the frequency $\omega/2\pi$ of the oscillator to be determined.

According to one embodiment, the sensor 20 is configured to also carry out a measurement of acceleration along at least one of the axes X or Y', which axis is referred to as the measurement axis. The example given below illustrates measurement of the acceleration $a_x$ along X.

To do this, step A and step B are implemented, then during the Ramsey time, in a step CAc, the microwave fields in the two microwave guides perpendicular to the measurement axis, here X, are gradually turned on. By choosing the right frequencies for the two microwave fields (see reference Ammar, M.; Dupont-Nivet, M.; Huet, L.; Pocholle, J.-P.; Rosenbusch, P.; Bouchoule, I.; Westbrook, C. I.; Estève, J.; Reichel, J.; Guerlin, C. & Schwartz, S. "Symmetric microwave potentials for interferometry with thermal atoms on a chip" Phys. Rev. A, American Physical Society, 2015, 91, 053623 Physical Review A, 91, 053623, 2015), it is possible to spatially separate the two states |a> and |b> along the X-axis by a distance d.

Thus, during the step CAc the accumulated phase is:

$$\varphi = \omega_0 t + \frac{m a_x d t}{\hbar}$$

Next, at the end of step CAc, the two microwave fields are gradually turned off to recombine the two states.

Lastly, in a step similar to step D, a second π/2 pulse transfers the phase difference to the populations of the two atomic states:

$$p_a = \tfrac{1}{2}[1+\cos(\varphi-\omega t)]$$

$$p_b = \tfrac{1}{2}[1-\cos(\varphi-\omega t)]$$

In a step similar to step E, the population in at least one of the two states |a> or |b> is measured to determine the acceleration. Thus, for this measurement of acceleration along an axis, the clouds of atoms travel a one-dimensional path along this same axis.

To measure the acceleration $a_{y'}$ along Y', the procedure used is the same as that used to measure acceleration along the X-axis, except that the two microwave fields are sent into the guides perpendicular to Y' (instead of the guides perpendicular to X). This makes it possible to separate the states |a> and |b> along the Y'-axis. So in the same way the accumulated phase is:

$$\varphi = \omega_0 t + \frac{m a_y d t}{\hbar}$$

Figure 14:
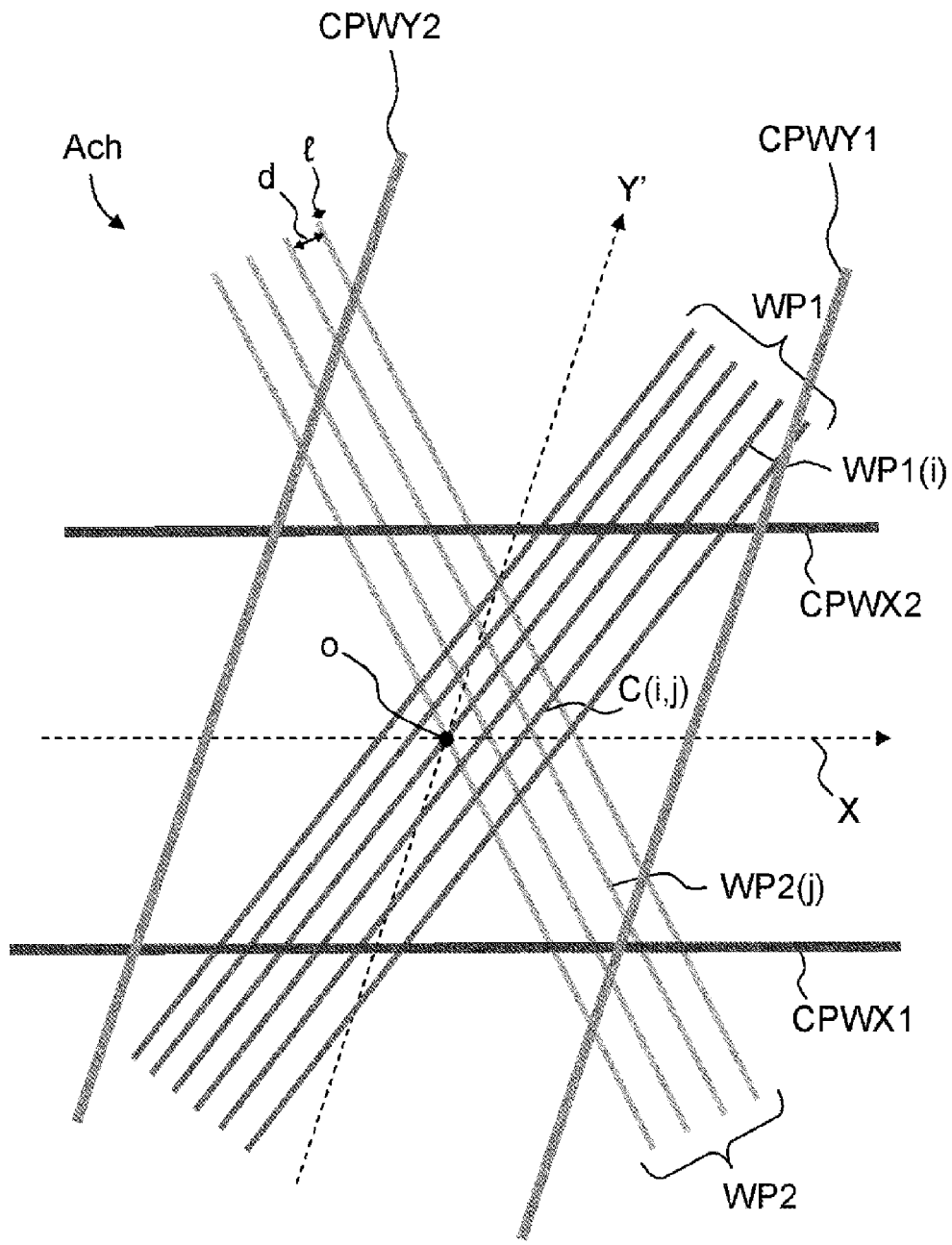
FIG. 14 illustrates an atom chip according to the invention compatible with a measurement about/along 3 axes, comprising a plurality of conductive wires placed parallel to the first conductive wire, forming a first plurality WP1 of conductive wires, and a plurality of conductive wires placed parallel to the second conductive wire, forming a second plurality of conductive wires.

The invention also relates to an atom chip further comprising a plurality of conductive wires placed parallel to the first conductive wire W1, forming a first plurality WP1 of conductive wires, and a plurality of conductive wires placed parallel to the second conductive wire W2, forming a second plurality WP2 of conductive wires, as illustrated in FIG. 14. A wire of the first plurality is indexed i (the index i varying from 1 to I) and a wire of the second plurality is indexed j (the index j varying from 1 to J). Typically I and J are about a few wires to ten/a few tens of wires. The two pluralities of wires are located on different levels and electrically insulated from each other.

The projection in the XY-plane of a wire WP1(i) of the first plurality and of a wire WP2(j) of the second plurality define a crossing point C(i,j) on the XY-plane. Since the wires are placed in two different planes, they do not physically cross on the XY-plane. The role of the crossing point is to situate the two conductive wires that define it, and the crossing point is said to be "on" when a DC current or voltage is applied in these two wires. Moreover, the first and second pluralities of conductive wires are arranged so that at least a set of crossing points is inside said parallelogram formed by the four waveguides. Point O is one crossing point among others of this set.

The use of a chip having this particular structure in a sensor allows the latter to take a measurement about/along three axes X, Y' and Z. The invention also relates to such a 3-axis sensor 30.

The speeds of rotation about X and Y' of the 3-axis sensor according to the invention are measured in the same way as above, except that here the closed paths TX and TY' may be initialized from crossing points different from 0, these crossing points being referred to as the first initialization crossing point Cx and second initialization crossing point Cy, respectively. For correct sensor operation, Cx is preferably located on the X-axis (equidistant from the two X-wise guides) and Cy is preferably located on the Y'-axis (equidistant from the Y'-wise guides). To simplify the implementation of the sensor, preferably the points Cx and Cy coincide with O.

The speed of rotation about Z is measured as described with respect to the prior art by travelling a path TZ contained in a plane parallel to the plane XY of the chip. The path Tz is initialized from a third crossing point Cz. To generate this path, X-wise waveguides or Y'-wise waveguides may be used. If it is chosen to use X-wise waveguides, preferably the pluralities WP1 and WP2 are arranged so that crossing points, including Cz (which crossing points will be turned on when the path TZ is travelled), are placed on the X-axis. Similarly, if it is chosen to use Y'-wise waveguides, preferably there must be crossing points (to be turned on), including Cz, on the Y'-axis.

Thus the plurality of wires WP1 and WP2 are therefore preferably configured so that a sub-set of the set of crossing points placed inside the parallelogram is located on the X-axis and so that another sub-set is located on the Y'-axis, as illustrated in FIG. 13.

Figure 15:
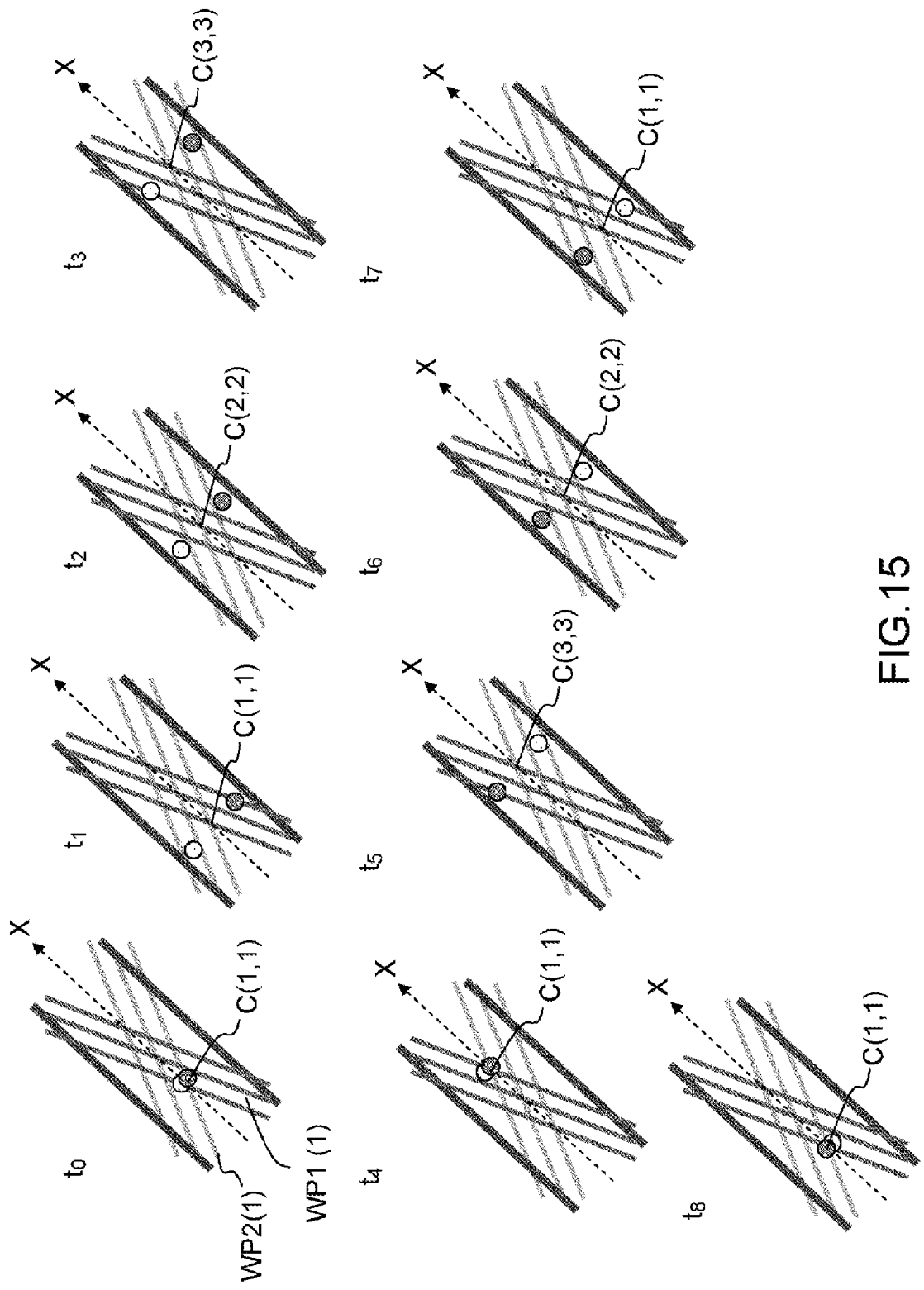
FIG. 15 illustrates the path, in a plane parallel to the plane of the atom chip, of two clouds of atoms trapped using the X-wise guides (the only ones shown).
Figure 16:
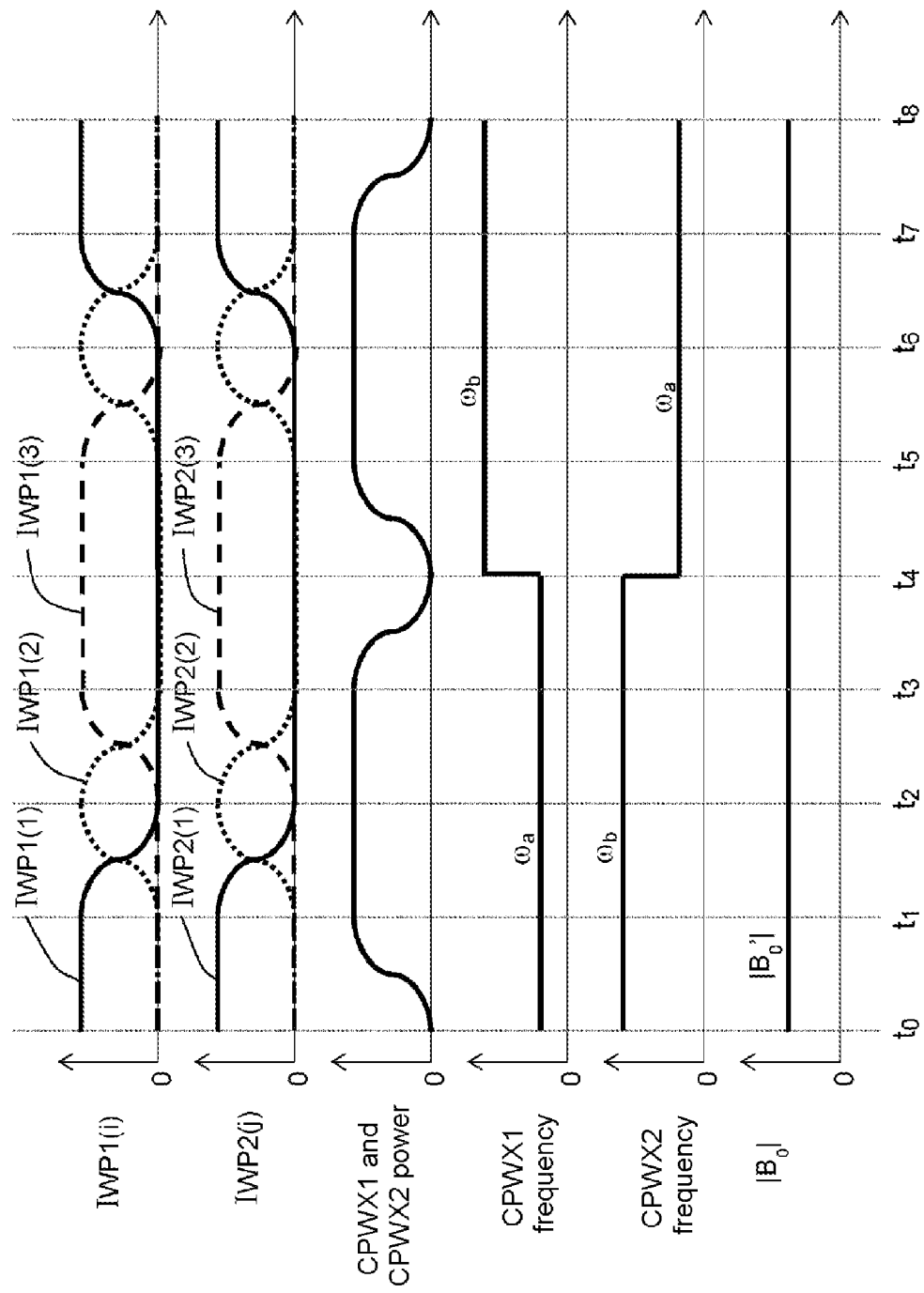
FIG. 16 illustrates the associated timing diagram of the values of the currents applied to the wires in question, of the microwave powers and frequency applied to the X-wise guides and of the uniform magnetic field as a function of time.

FIG. 15 illustrates, for 8 times t1 to t8, the path TZ of the two clouds of trapped atoms when X-wise guides (the only ones shown) are used, 3 crossing points C(1,1), C(2,2) and C(3,3) being successively turned on in that order and then in the inverse order. FIG. 16 illustrates the timing diagram associated with the values of the currents applied to the wires in question, of the microwave powers and frequency applied to the X-wise guides and of the uniform magnetic fields, as a function of time between t1 and t8. As the path TZ is travelled at a constant height h, the applied uniform field has a constant absolute value and the current in the conductive wires remains constant between the times of interest.

A redundant, and therefore more accurate, measurement of the speed of rotation $\Omega_z$ about Z may be obtained by taking this measurement successively by turning on X-wise waveguides (and the associated crossing points) and Y'-wise waveguides (and the associated crossing points).

To simplify implementation of the sensor, the point Cz preferably coincides with O, which initialization point is compatible with implementation of both redundant measurements from the same initialization point.

Thus the 3-axis sensor 30 allows a measurement of the speeds of rotation $\Omega_x$, $\Omega_y$, $\Omega_z$, and of the accelerations $a_x$ and $a_y$.

The invention also relates to a method for measuring a speed of rotation about three axes X, Y' and Z using a cold-atom sensor comprising an atom chip compatible with such a measurement and such as illustrated in FIG. 14 and FIG. 17, 18 or 19 (see below).

In the case of measurement about the X-axis, the method is carried out in the same way as for a measurement about two axes, by implementing steps A to E such as described previously. The difference is that here the first closed path TX, contained in a plane perpendicular to X, is initialized from a first initialization crossing point Cx located on the X-axis that is not necessarily O.

Likewise, in the case of measurement about the Y'-axis, the method is carried out in the same way as for a measurement about two axes, by implementing steps A to E such as described above with a second closed path TY' contained in a plane perpendicular to Y' and initialized from a second initialization crossing point Cy located on the Y'-axis.

To measure the speed of rotation about the Z-axis, after implementing steps A and B such as described above in a step C', a cloud of atoms of internal state |a> in one trap T1 is spatially separated from a cloud of atoms of internal state |b> in another trap T2, and the traps are moved in opposite directions along a closed path contained in a plane perpendicular to the Z-axis as described with respect to the prior art, by successively turning on the crossing points of interest. The path Tz is initialized from a third initialization crossing point Cz. It is possible to use X-wise waveguides or Y'-wise waveguides to describe this path TZ, the crossing point then having to be placed on the axis of symmetry of the two guides (X for the X-wise guides, Y' for the Y'-wise guides). Step C' is implemented by applying a voltage or a current at predetermined microwave frequencies to the first and second guides along the chosen axis, and by applying a DC current or voltage to the conductive wires of the first and second pluralities of conductive wires in a predetermined sequence, so as to successively excite crossing points placed on or in the vicinity of the chosen axis. Lastly, steps D and E such as described above are carried out.

The conductive wires of each plurality have a width I and are separated by a distance d, this width and this distance not necessarily being the same for all the wires. Preferably the width I and the distance d are the same for all the wires and respect:

$$I/2 \leq d \leq 2I$$

This condition makes it possible to move the traps from one crossing point to the next while minimizing deformation of the traps.

Figure 17:
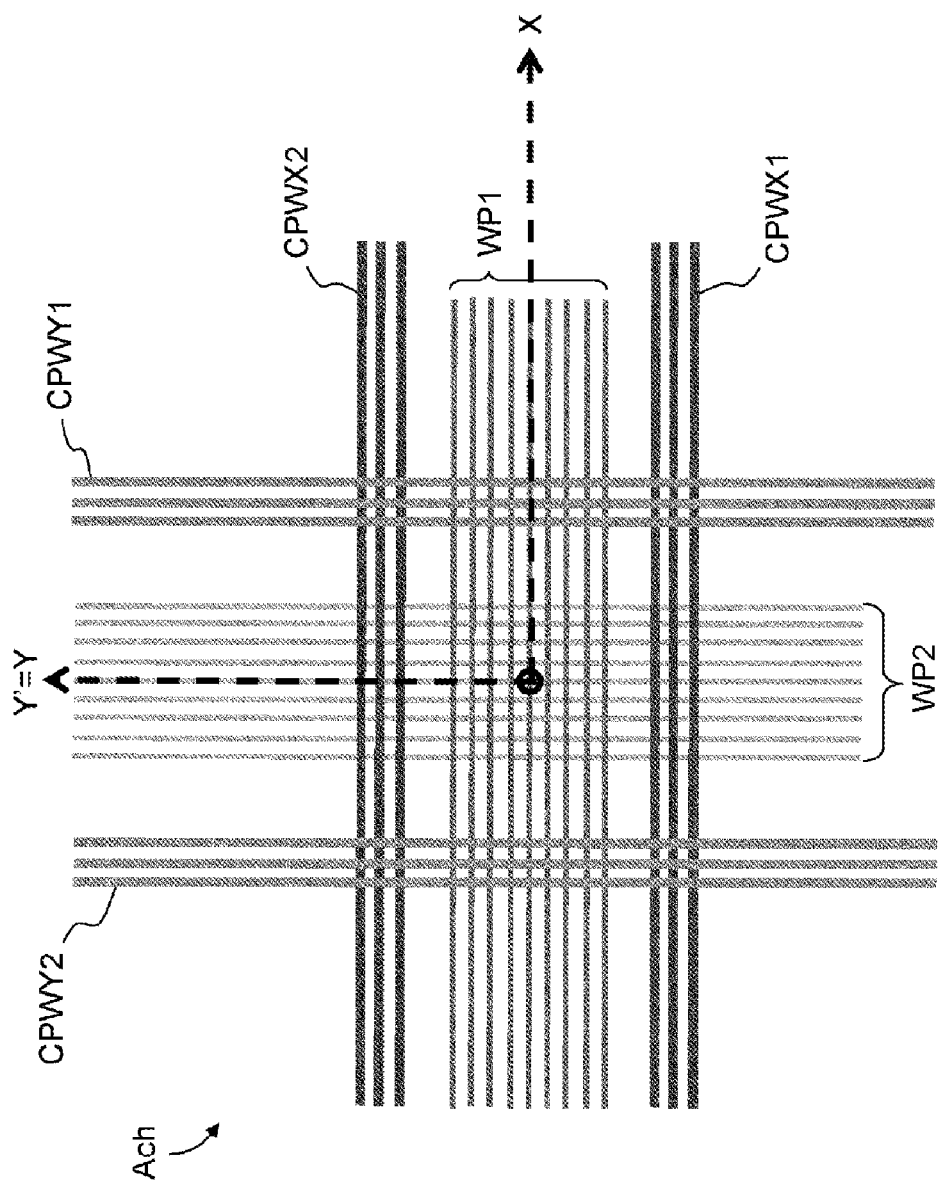
FIG. 17 illustrates a first variant of a compatible 3-axis atom chip in which the Y'-axis coincides with Y and the two pluralities of wires are each parallel to one axis.

According to a first variant, illustrated in FIG. 17, the Y'-axis coincides with Y and the two pluralities are each parallel to one axis.

Figure 18:
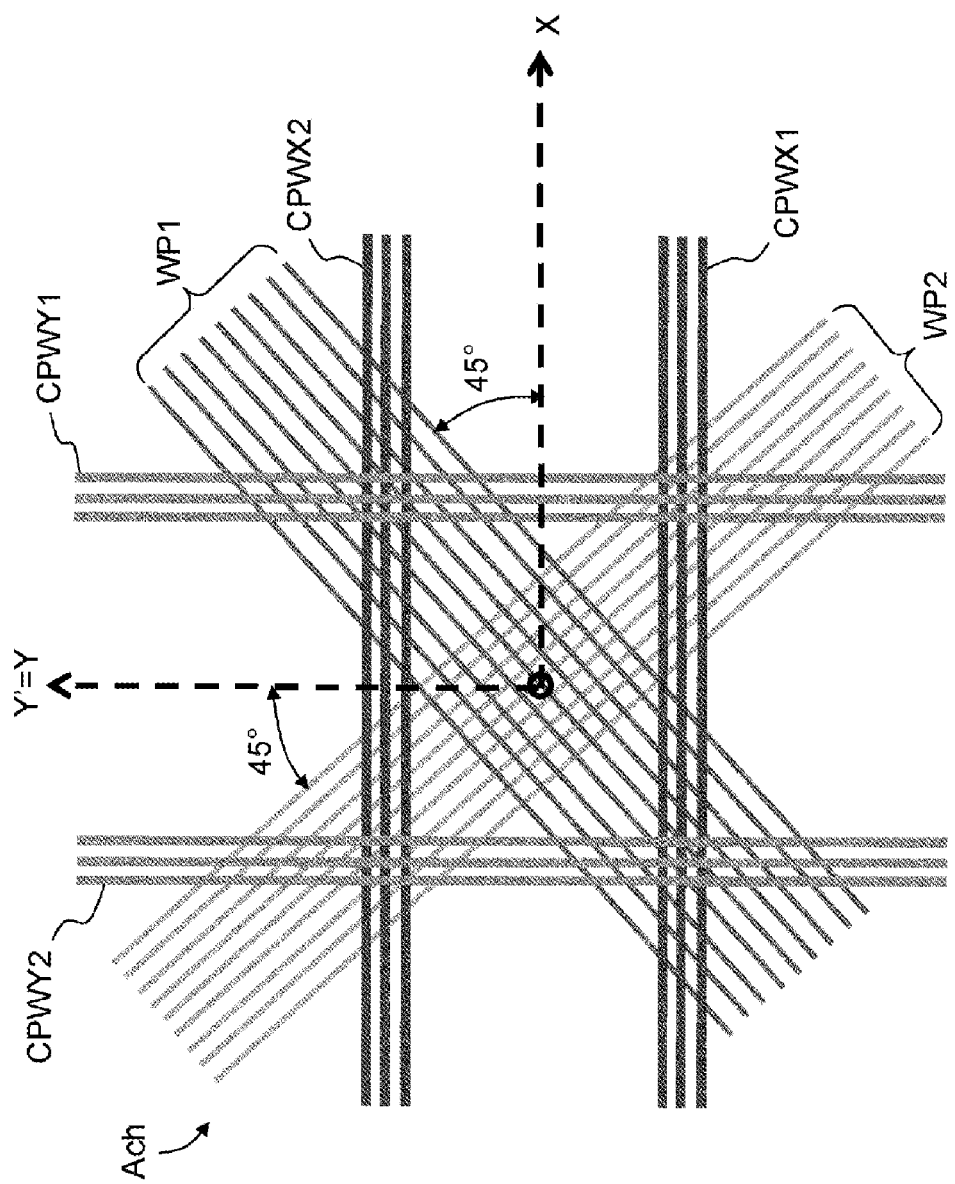
FIG. 18 illustrates a second variant of a compatible 3-axis atom chip in which the Y'-axis coincides with Y and the two pluralities of wires are mutually perpendicular and make an angle of 45° to the X- and Y-axes.

According to a preferred second variant, illustrated in FIG. 18, the Y'-axis coincides with Y, and the two pluralities of wires are mutually perpendicular and make an angle of 45° to the X- and Y-axes. This geometry makes it possible to orient the axes specific to the traps perpendicular to the guides. The traps have an ellipsoidal shape and the specific axes are the axes of this ellipsoidal shape.

Figure 19:
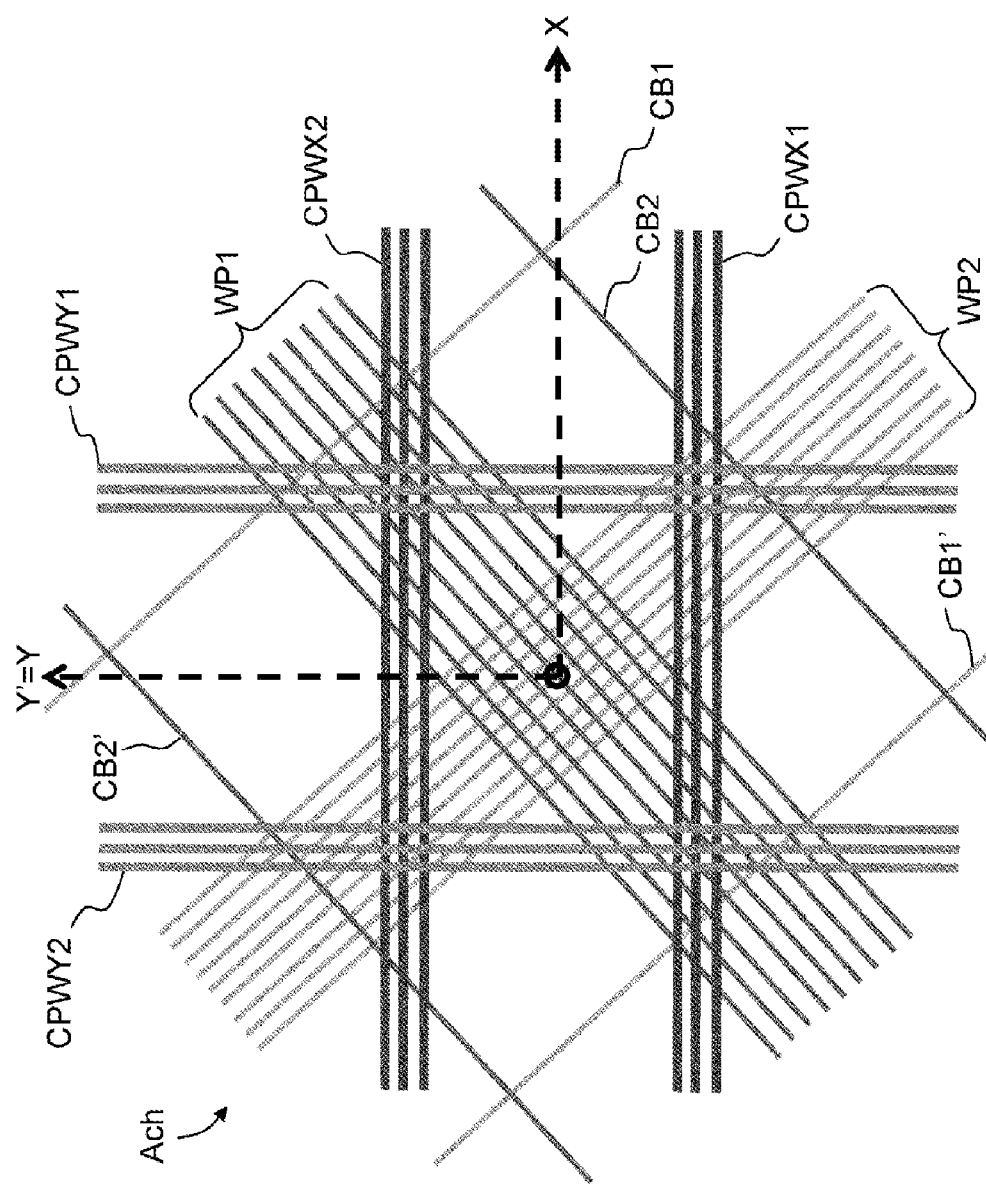
FIG. 19 illustrates a sub-variant of the variant of FIG. 18 in which the generation of the uniform magnetic field, also referred to as the bias field, is integrated into the atom chip by adding conductive wires.

According to one sub-variant of the variant of FIG. 18, which sub-variant is illustrated in FIG. 19, the generation of the uniform magnetic field, also referred to as the bias field, is integrated into the atom chip by adding conductive wires.

Two wires CB1, CB1' that run parallel to each other and perpendicular to the wires of WP1, and that are preferably placed outside the parallelogram, have been added to the level of WP1, so as to allow, when a DC current is applied to these two wires, a bias field to be applied perpendicular to CB1 and CB1'. Similarly, two wires CB2, CB2' that run perpendicular to the wires of WP2 have been added to the level of WP2, so as to allow a bias field to be applied perpendicular to CB2 and CB2'.

This configuration has the advantage that the generation of the bias field is integrated into the chip.

According to another aspect, the invention relates to a matrix-array atom chip such as described in FIGS. 20 to 23.

Figure 20:
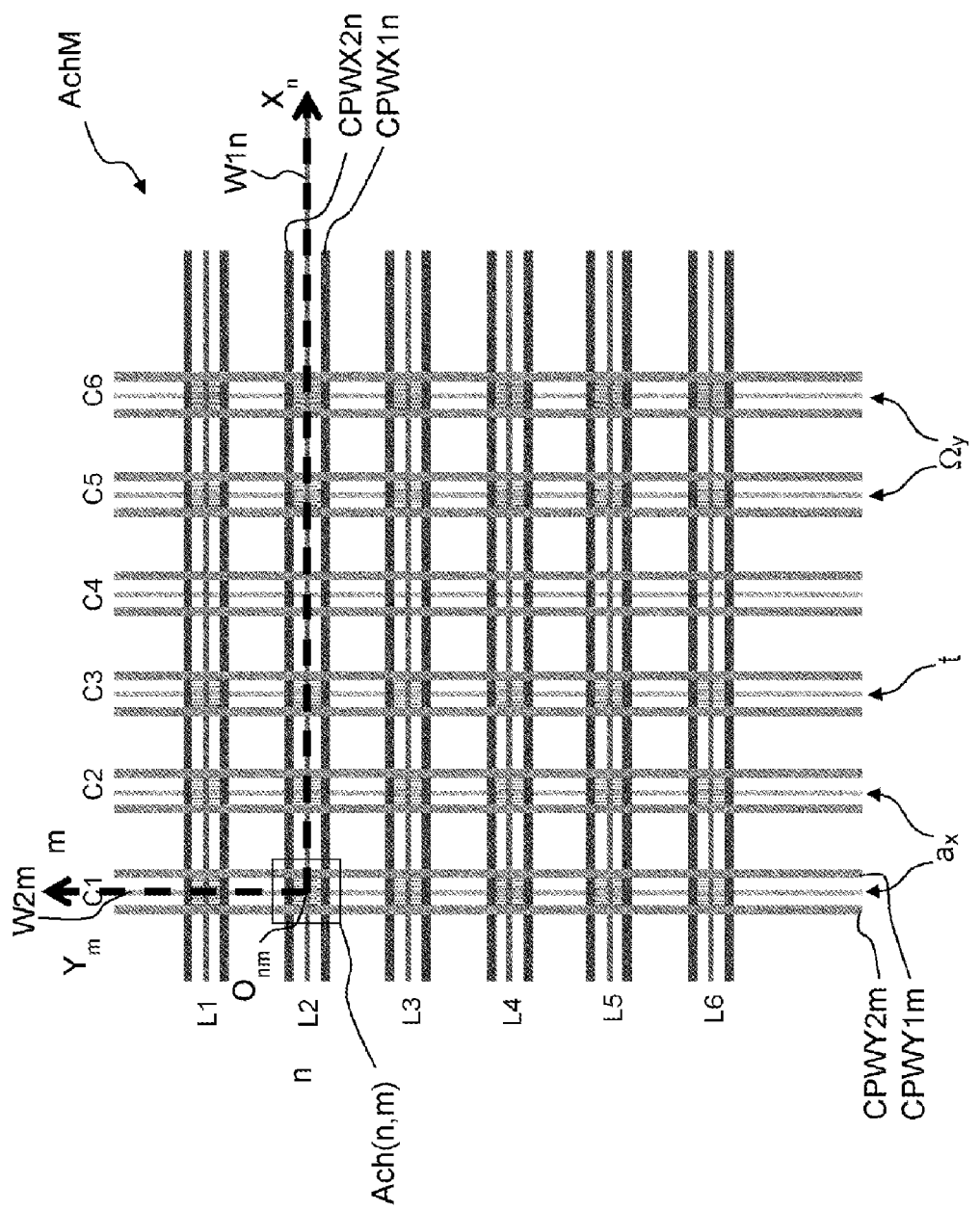
FIG. 20 illustrates a first non-limiting example of use of a first variant matrix-array chip according to the invention to produce a measurement assembly.
Figure 21:
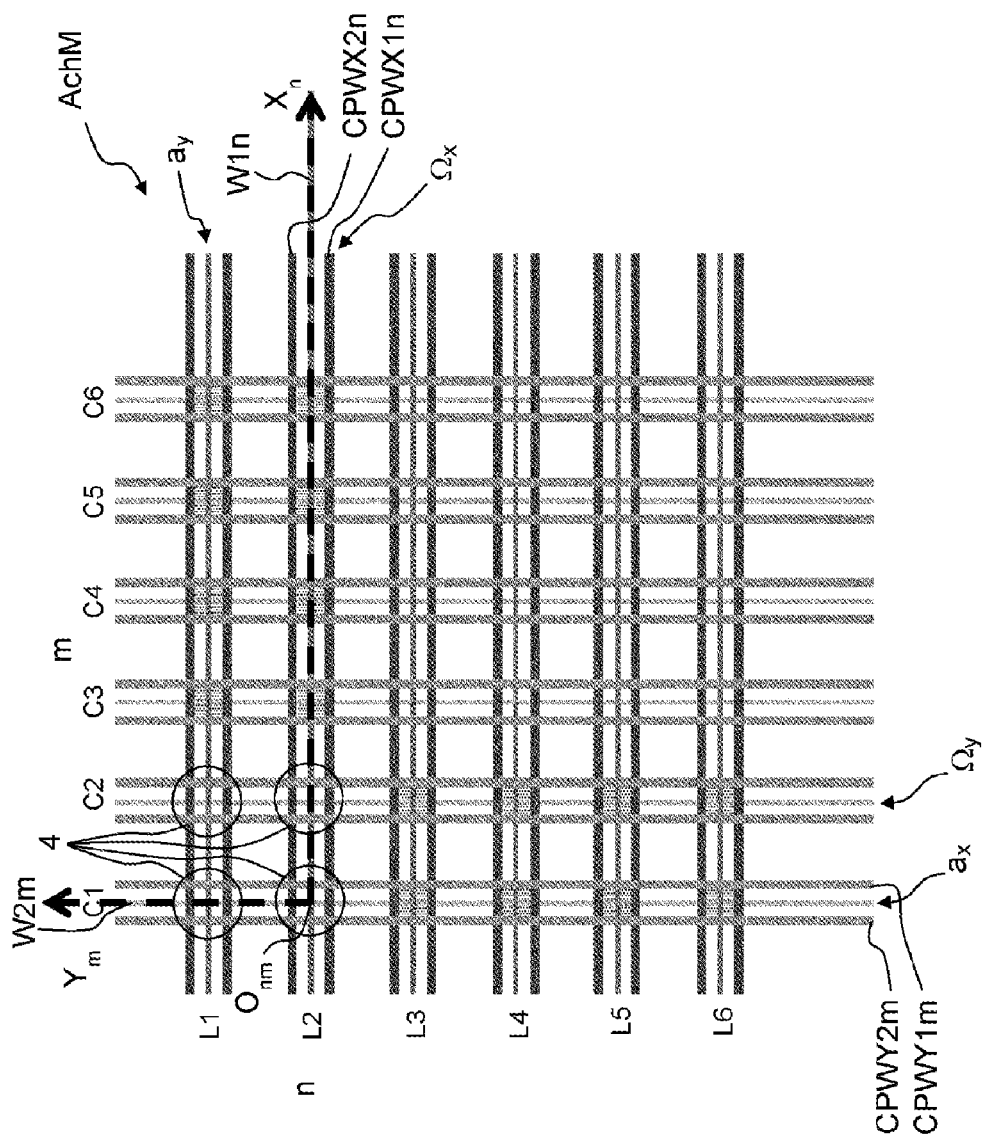
FIG. 21 illustrates another non-limiting example of use of the first variant matrix-array chip.

According to a first variant of the atom chip AchM, which variant is illustrated in FIGS. 20 and 21, said chip comprises a first set of first conductive wires W1n indexed n (N wires) and a second set of second conductive wires W2m indexed m (M wires) that are mutually perpendicular and that form rows and columns of a matrix array, respectively. Each of the first conductive wires Win coincides with one axis Xn (X-axis indexed n) and each of the second conductive wires W2m coincides with one axis Ym (Y-axis indexed m).

With this arrangement, the guides CPWX1n, CPWX2n along the axis Xn are thus common to all the pixels of row n, and the guides CPWY1m, CPWY2m along the axis Ym are thus common to all the pixels of column m.

Each pixel of the matrix array then forms one elementary chip Ach(n,m) such as described above (see FIG. 9). The elementary chips arranged in this matrix array are located on the same substrate.

Integrated into a sensor, the elementary chips allow a plurality of measurements of a quantity chosen from ax and/or ay and/or $\Omega$x and/or $\Omega$y to be taken in parallel. They may also measure a time t. They are in addition reconfigurable to take other measurements in another sequence.

Measurement of ax and Ωy requires the Y-wise guides (columns) to be turned on, and measurement of ay and Ωx requires the X-wise guides (rows) to be turned on.

Figure 1:
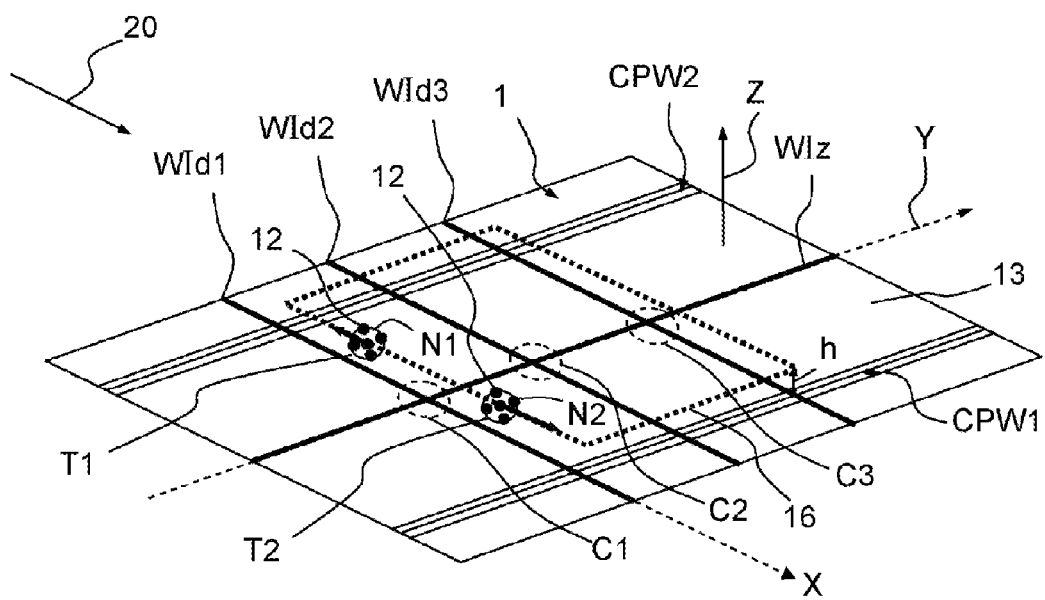
FIG. 1 (already cited) illustrates one example of the topology of the conductive wires and microwave guides, and of the path of two clouds of atoms.
Figure 2:
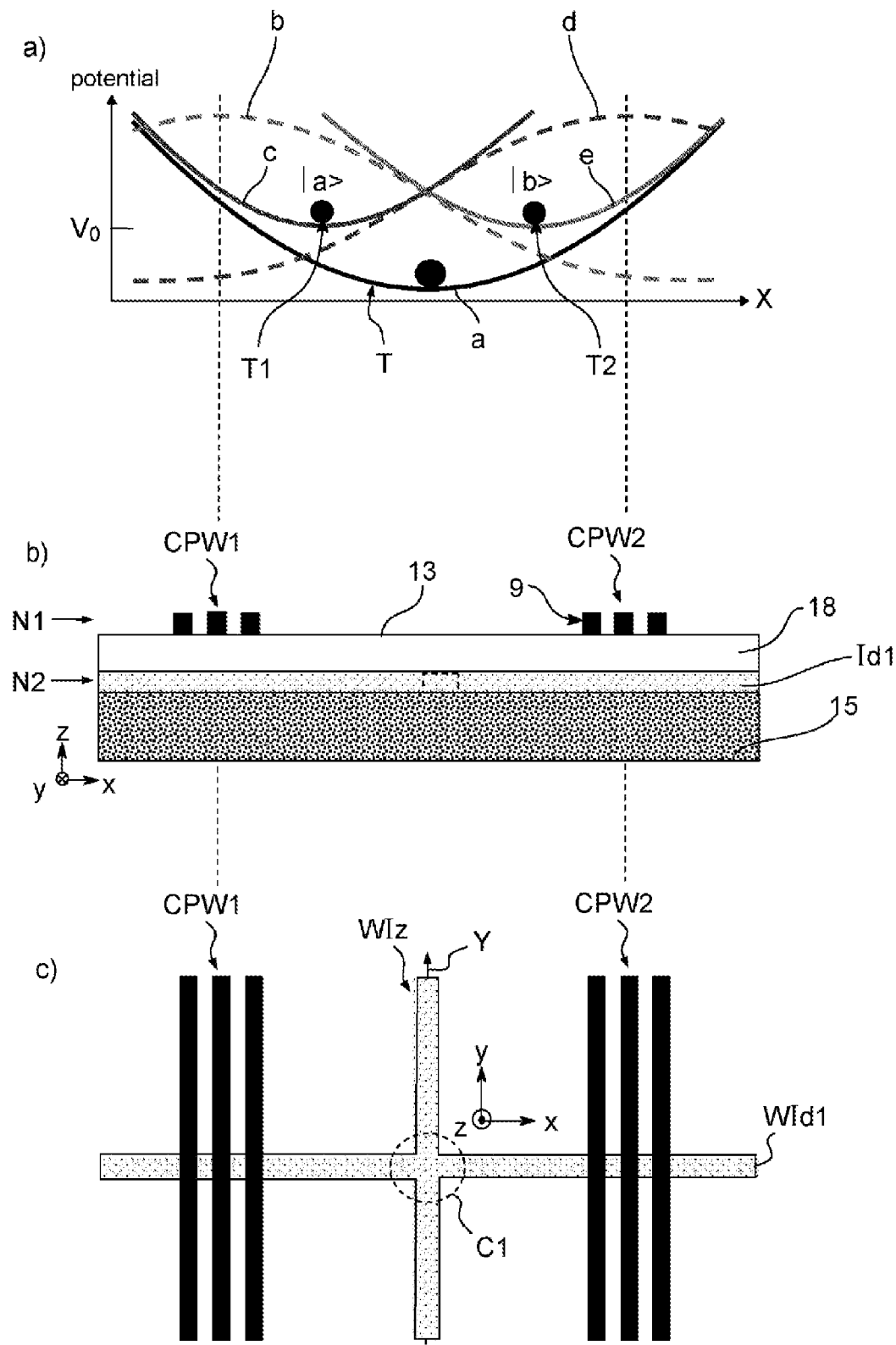
FIG. 2 (already cited) illustrates the geometry of the guides and wires of the atom chip as well as the traps T1 and T2.

Preferably, each level, such as illustrated in FIG. 2, comprises elements of a type chosen from: coplanar guides along X1 to XN, coplanar guides along Y1 to YM, conductive wires WP11 to WP1N, and conductive wires WP21 to WP2M.

FIG. 20 illustrates a first non-limiting example of use of the matrix-array chip AchM to produce a measurement assembly.

In this example N=M=6. Columns C1 and C2 are used for the measurement of ax, columns C5 and C6 for measurements of Ωy and column C3 to measure time t. The acceleration ax and the speed of rotation are each measured in parallel by 2×6 elementary chips, and the time by 6 chips, which allows a more accurate measurement. Column C4 is not used in this measurement sequence.

Chips used for a measurement have been shaded gray for greater clarity.

FIG. 21 illustrates another non-limiting example of use of the matrix-array chip AchM. The chips of column C1 measure ax, the chips of column C2 measure Ωy, the chips of row L1 measure ay and the chips of row L2 measure Ωx. As a measurement requires a particular sequence for the required coplanar guides, the latter cannot be shared in 2 simultaneous measurements of two distinct inertial parameters. Thus the elementary chips 4 encircled by a circle are not used.

The matrix-array chip is thus reconfigured as required: the desired type of measurement (ax, ay, Ωx, Ωy, t), the desired accuracy (which depends on the number of chips that take the measurement simultaneously), etc. Parallel, redundant and/or complementary measurements are thus carried out on the same matrix-array chip.

This variant has the advantage of being easily controllable, but the orientation of the traps (specific axes) with respect to the waveguides is not optimal.

Figure 22:
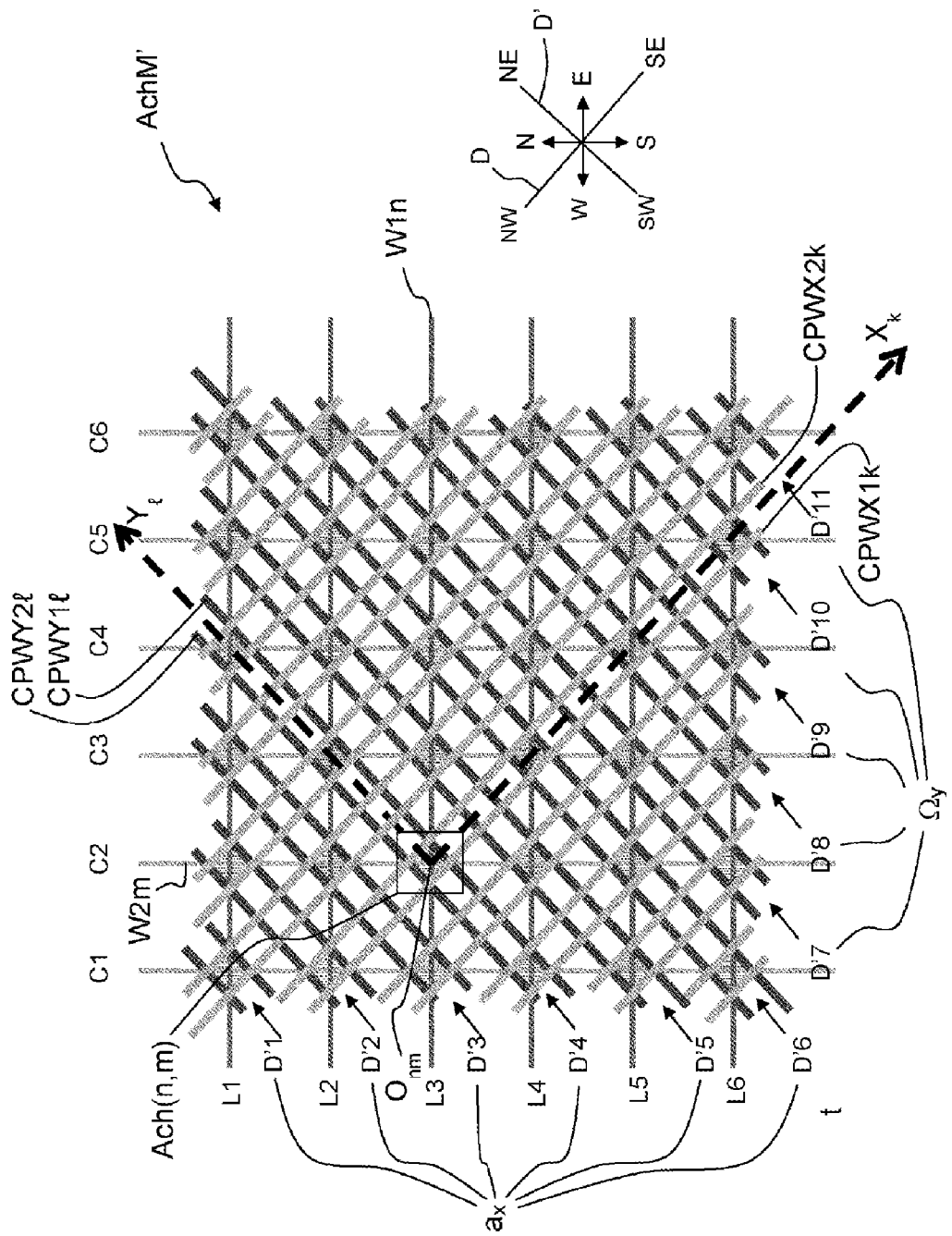
FIG. 22 illustrates a first non-limiting example of use of a second variant of the matrix-array chip to produce a measurement assembly.
Figure 23:
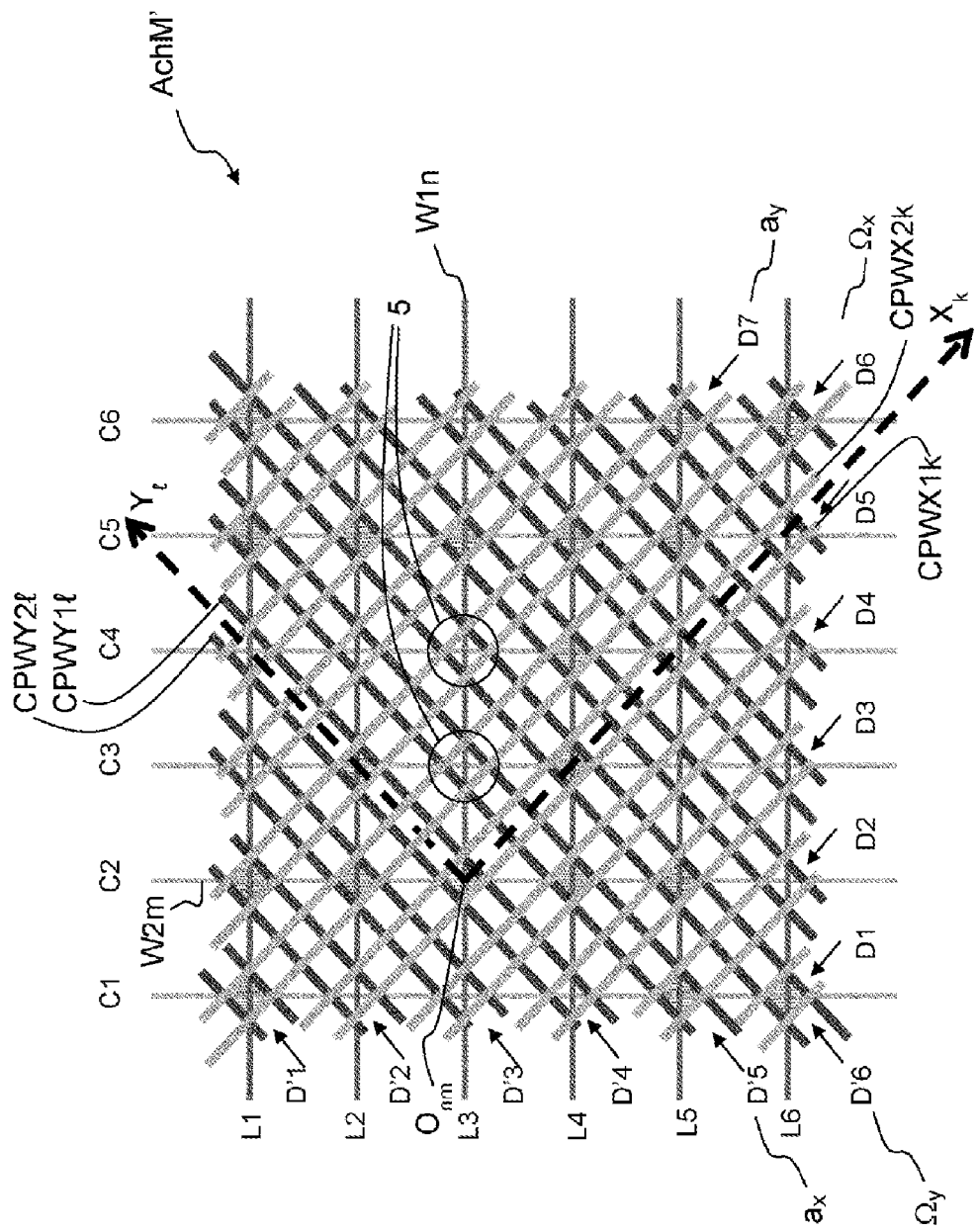
FIG. 23 illustrates another non-limiting example of use of a second variant of the matrix-array chip according to the invention.

According to a second variant of the atom chip AchM', which variant is illustrated in FIGS. 22 and 23, said chip comprises a first set of first conductive wires W1n and a second set of second conductive wires W2m that are mutually perpendicular and that form rows and columns of a matrix array, respectively, as above.

Each of the first conductive wires indexed n and of the second conductive wires indexed m is oriented at 45° from an axis Xk and at 45° from an axis Yl (elementary chip similar to FIG. 10), respectively. The guides CPWX1k, CPWX2k along the axis Xk are thus common to all the pixels of a first diagonal Dk of the matrix array, and the guides CPWY1l, CPWY2l along the axis Yl are thus common to all the pixels of a second diagonal Dl'.

FIG. 22 illustrates a first non-limiting example of use of the matrix-array chip AchM' to produce a measurement assembly.

In this example N=M=6. The first 5 south west-north east diagonals D1' to D5' are used for the measurement of ax, the sixth diagonal D6' is used for the measurement of t and the seventh to eleventh diagonals D7' to D11' are used for the measurements of Ωy. All chips in the matrix array AchM' are used in this example.

FIG. 23 illustrates another non-limiting example of use of the matrix-array chip AchM'. The diagonal D5' measures ax, and the diagonal D6' measures Ωy.

The diagonal D6 measures Ωx, and the diagonal D7 measures ay. Thus the elementary chips 5 encircled by a circle are not used for the same reasons as above.

This variant is more difficult to control than the previous variant but has the advantage of a good orientation of the traps (specific axes) with respect to the waveguides.

In order to make it possible for the matrix-array chip to measure Ωz, according to a third variant that is combinable with the first two variants, in the matrix-array chip at least one conductive wire of the first or of the second set is replaced by a plurality of mutually parallel conductive wires, a portion of the conductive wires of said plurality being comprised in the associated parallelograms (here rectangles) (see elementary chips of FIGS. 17 and 18).

According to another aspect, the invention relates to a cold-atom sensor 40 comprising a matrix-array chip AchM or AchM' and also comprising, just like the preceding sensors:

an atom source S arranged to generate a cloud of ultracold atoms near the XY-plane of said atom chip, a generator GB of a uniform magnetic field B0, at least one processor UT, at least one DC current or voltage generator GDC suitable for controlling electric currents in the conductive wires and at least one microwave current or voltage generator GMW connected to the waveguides, a system SDET for detecting optical intensity.

This sensor is suitable for measuring, using said elementary chips, and as required and in a reconfigurable manner, at least one acceleration ax or ay and/or one speed of rotation Ωx and/or Ωy, along/about at least one direction corresponding to that of the axes Xn and/or the axes Ym. It may also be suitable for measuring time and, where applicable, the speed of rotation Ωz (third atom-chip variant).

The invention claimed is:

1. An atom chip (Ach) for an ultracold-atom sensor, said chip comprising an XY-plane normal to a Z-axis, the atom chip comprising:

first and second coplanar waveguides (CPWX1, CPWX2) suitable for propagating microwaves at respective angular frequencies $\omega_a$ and $\omega_b$, said waveguides being placed symmetrically on either side of the X-axis and being referred to as X-wise guides, first and second coplanar waveguides (CPWY'1, CPWY'2) suitable for propagating microwaves at respective angular frequencies $\omega'_a$ and $\omega'_b$, said waveguides being placed symmetrically on either side of an axis the projection of which in the XY-plane is along an axis Y' that is different from the X-axis and that is contained in the XY-plane, and being referred to as Y'-wise guides, the X-wise guides being electrically insulated from the Y'-wise guides, an intersection of said guides forming a parallelogram of center O defining an origin of the reference frame XYZ, at least a first conductive wire (W1) and a second conductive wire (W2) the respective projections of which in the XY-plane are secant at O and make between them an angle larger than or equal to 20°, said conductive wires being suitable for being passed through by DC currents.

2. The atom chip as claimed in claim 1, wherein the X-wise guides, the Y'-wise guides, the first conductive wire and the second conductive wire are each placed on a different level, each level being electrically insulated from the neighboring levels, said levels forming a stack (Emp) placed on a substrate (Sub).

3. The atom chip as claimed in claim 1, wherein the projection in the XY-plane of the first conductive wire (W1)

is oriented along the X-axis and the projection in the XY-plane of the second conductive wire (W2) is oriented along the Y'-axis.

4. The atom chip as claimed in claim 1, wherein the Y'-axis coincides with the Y-axis.

5. The atom chip as claimed in claim 1, wherein the Y'-axis coincides with the Y-axis, and wherein the respective projections of the first conductive wire and of the second conductive wire in the XY-plane are mutually perpendicular and oriented at 45° from the X- and Y-axes, respectively.

6. The atom chip as claimed in claim 1, further comprising a plurality of conductive wires placed parallel to said first conductive wire, forming a first plurality of conductive wires (W1P), and a plurality of conductive wires placed parallel to said second conductive wire, forming a second plurality of conductive wires (W2P), a projection in the XY-plane of a wire of the first plurality and of a wire of the second plurality defining a crossing point on the XY-plane, said first and second pluralities of conductive wires being arranged so that at least a set of crossing points is inside said parallelogram.

7. The atom chip as claimed in claim 6, wherein the first plurality and second plurality of conductive wires are configured so that a sub-set of said set of crossing points is located on the X-axis and another sub-set of said set of crossing points is located on the Y'-axis.

8. The atom chip as claimed in claim 6, wherein the conductive wires have a width and wherein a distance (d) between two neighboring conductive wires is comprised between 0.5 times and 2 times said width.

9. An ultracold-atom sensor allowing a measurement of speed of rotation about three axes X, Y' and Z, comprising:
   an atom chip (ACh) as claimed in claim 6 placed in a vacuum chamber,
   an atom source arranged to generate a cloud of ultracold atoms near said XY-plane of said atom chip, said ultracold atoms having in the initialized state a superposition of internal states |a> and |b>,
   a generator (GB) of a uniform magnetic field (B0),
   at least one processor, at least one DC current or voltage generator suitable for controlling electric currents in said conductive wires and at least one microwave current or voltage generator connected to said waveguides,
   said waveguides and said conductive wires being configured to:
   modify the energy of said ultracold atoms so as to create a potential well for the ultracold atoms in the internal state |a> and a potential well for the ultracold atoms in the internal state |b>, thus forming a first ultracold-atom trap (T1) and a second ultracold-atom trap (T2), one trap making it possible to immobilize a cloud of ultracold atoms in an internal state different from the other trap, at a controlled distance from said measurement plane, and
   spatially separate the two traps and move said traps (T1, T2) along a first closed path (TX) contained in a plane perpendicular to X and initialized from a first initialization crossing point (Cx) located on the X-axis, a second closed path (TY') contained in a plane perpendicular to Y' and initialized from a second initialization crossing point (Cy) located on the Y'-axis, and a third closed path (TZ) contained in a plane perpendicular to Z and initialized from a third initialization crossing point (Cz) located at point O, each path being travelled in one direction by the ultracold atoms of the first trap and in the opposite direction by the ultracold atoms of the second trap,
   the sensor further comprising a system for detecting optical intensity, suitable for measuring at least one population of said ultracold atoms in a said internal state.

10. The three-axis sensor as claimed in claim 9, wherein said waveguides and the at least one microwave current or voltage generator, said conductive wires and the at least one DC current or voltage generator, and the generator of the uniform magnetic field, are configured so that the first and second closed paths (TX, TY') each comprise at least a first portion located at a first height (h1) from the XY-plane and a second portion located at a second height (h2) strictly larger than the first height, and so as to cause passage from the first height to the second height via:
   an increase in a value of the DC current passing through each conductive wire defining the associated initialization crossing point, between a first non-zero value ($I_{W1i}'$, $I_{W2j}'$) and a second non-zero value ($I_{W1i}''$, $I_{W2j}''$) and/or,
   a decrease in a value of the uniform magnetic field between a first non-zero value (B0') and a second non-zero value (B0''), and vice versa for passage from the second height to the first height.

11. A matrix-array atom chip (AchM) as claimed in claim 1, comprising a first set of first conductive wires (W1n) indexed n and a second set of second conductive wires (W2m) indexed m that are mutually perpendicular and that form rows and columns of a matrix array, respectively, each of the first conductive wires indexed n and of the second conductive wires indexed m being coincident with an axis Xn indexed n and with an axis Ym indexed m, respectively, guides (CPWX1n, CPWX2n) along the Xn-axis thus being common to all the pixels of row n and guides (CPWY1m, CPWY2m) along the Ym-axis thus being common to all the pixels of column m, each pixel of the matrix array forming one elementary chip (Ach(n,m)).

12. The matrix-array atom chip as claimed in claim 11, wherein at least one conductive wire of the first or of the second set is replaced by a plurality of conductive wires that are parallel to one another, a portion of the conductive wires of said plurality being comprised in the associated parallelograms.

13. An ultracold-atom sensor, comprising:
   a matrix-array atom chip as claimed in claim 11,
   an atom source(S) arranged to generate a cloud of ultracold atoms near said XY-plane of said atom chip,
   a generator (GB) of a uniform magnetic field (B0),
   at least one processor (UT), at least one DC current or voltage generator (GDC) suitable for controlling electric currents in said conductive wires and at least one microwave current or voltage generator (GMW) connected to said waveguides,
   a system (SDET) for detecting optical intensity,
   the sensor being suitable for measuring, as required and in a reconfigurable manner, at least one acceleration (ax, ay) and/or one speed of rotation ($\Omega x$, $\Omega y$) along/about at least one direction corresponding to that of the axes Xn and/or the axes Ym, using said elementary chips.

14. A matrix-array atom chip (AchM) as claimed in claim 1, comprising a first set of first conductive wires (W1n) indexed n and a second set of second conductive wires (W2m) indexed m that are mutually perpendicular and that form rows and columns of a matrix array, respectively, each of the first conductive wires indexed n and of the second conductive wires indexed m being oriented at 45° from an axis Xk indexed k and at 45° from an axis Yl indexed m, respectively, guides (CPWX1k, CPWX2k) along the Xk-axis thus being common to all the pixels of a first diagonal of the matrix array and guides (CPWY1l, CPWY2l) along the Yl-axis thus being common to all the pixels of a second diagonal, each pixel of the matrix array forming one elementary chip (Ach(n,m)).

15. An ultracold-atom sensor allowing a measurement of speed of rotation about at least two axes X and Y', comprising:
- an atom chip (ACh) as claimed in claim 1 placed in a vacuum chamber,
- an atom source(S) arranged to generate a cloud of ultracold atoms near said XY-plane of said atom chip,
- said ultracold atoms having, during the phase of initialization of the implementation of the sensor, a superposition of internal states |a> and |b>
- a generator (GB) of a uniform magnetic field (B0),
- at least one processor (UT), at least one DC current or voltage generator (GDC) suitable for controlling electric currents in said conductive wires and at least one microwave current or voltage generator (GMW) connected to said waveguides,
- said waveguides, said conductive wires and, where appropriate, the magnetic field being configured, during the implementation of the sensor, to:
- modify the energy of said ultracold atoms so as to create a potential well for the ultracold atoms in the internal state |a> and a potential well for the ultracold atoms in the internal state |b>, thus forming a first ultracold-atom trap (T1) and a second ultracold-atom trap (T2), one trap making it possible to immobilize a cloud of ultracold atoms in an internal state different from the other trap, at a controlled distance from said measurement plane, and
- spatially separate the two traps and move said traps (T1, T2) along at least a first closed path (TX) contained in a plane perpendicular to X and a second closed path (TY') contained in a plane perpendicular to Y', each path being travelled in one direction by the ultracold atoms of the first trap and in the opposite direction by the ultracold atoms of the second trap,
- the sensor further comprising a system (SDET) for detecting optical intensity, suitable for measuring at least one population of said ultracold atoms in a said internal state.

16. The two-axis sensor as claimed in claim 15, wherein said waveguides and the at least one microwave current or voltage generator, said conductive wires and the at least one DC current or voltage generator, and the generator of the uniform magnetic field, are configured so that the first closed path (TX) and second closed path (TY') each comprise at least a first portion located at a first height (h1) from the XY-plane and a second portion located at a second height (h2) strictly larger than the first height, and so as to cause passage from the first height to the second height via:
- an increase in the value of the DC current passing through each conductive wire, between a first non-zero value ($I_{W1}'$, $I_{W2}'$) and a second non-zero value ($I_{W1}''$, $I_{W2}''$) and/or,
- a decrease in a value of the uniform magnetic field between a first non-zero value (B0') and a second non-zero value (B0''),
and vice versa for passage from the second height to the first height.

17. A method for measuring a speed of rotation about two axes X and Y' using an ultracold-atom sensor comprising an atom chip, said atom chip being placed in a vacuum chamber and comprising an XY-plane normal to a Z-axis, the atom chip comprising:
- first and second coplanar waveguides (CPWX1, CPWX2) suitable for propagating microwaves at respective angular frequencies $\omega_a$ and $\omega_b$, said waveguides being placed symmetrically on either side of the X-axis and being referred to as X-wise guides,
- first and second coplanar waveguides (CPWY'1, CPWY'2) suitable for propagating microwaves at respective angular frequencies $\omega'_a$ and $\omega'_b$, said waveguides being placed symmetrically on either side of an axis the projection of which in the XY-plane is along an axis Y' that is different from the X-axis and that is contained in the XY-plane, and being referred to as Y'-wise guides,
- the X-wise guides being electrically insulated from the Y'-wise guides, an intersection of said guides forming a parallelogram of center O defining an origin of the reference frame XYZ,
- at least a first conductive wire (W1) and a second conductive wire (W2) the respective projections of which in the XY-plane are secant at the point O and make between them an angle larger than or equal to 20°, said conductive wires being suitable for being passed through by DC currents,
- the method comprising, to measure the speed of rotation about one of the axes X and Y', which axis is referred to as the measurement axis, the steps of:
- A generating a cloud of said ultracold atoms, this including phases of dispensing said atoms, of cooling said atoms, of initializing said atoms to at least one internal state |a> and of trapping a cloud of said ultracold atoms in a local potential well, at a first height (h1) from said XY-plane, said trapping being carried out by passing DC currents through the first and second conductive wires,
- B initializing the internal states by coherently superposing said ultracold atoms between said states |a> and |b> via a first π/2 pulse;
- C spatially separating a cloud of said atoms of said internal state |a> in one trap (T1) from a cloud of said atoms of said internal state |b> in another trap (T2), and moving said traps in opposite directions along a closed path contained in a plane perpendicular to the measurement axis and initialized from the point O, by applying a voltage or a current at predetermined microwave frequencies to said first and second guides along the measurement axis, by applying at least two different DC current or voltage values to the first and second conductive wires and/or by applying at least two different values of a uniform magnetic field, in a predetermined sequence, said path comprising a portion located at a second height (h2) from the XY-plane different from the first height (h1),
- D recombining said internal states |a> and |b> by applying to said ultracold atoms a second π/2 pulse then measuring the density of atoms in an internal state chosen from at least |a> and |b>,
- E determining the Sagnac phase shift of said ultracold atoms and computing the speed of rotation of said sensor about said measurement axis,
- the method further comprising implementing steps A to E to measure the speed of rotation about the other measurement axis.

18. A method for measuring a speed of rotation about three axes X, Y' and Z using a cold-atom sensor comprising an atom chip, said atom chip being placed in a vacuum chamber and comprising an XY-plane normal to a Z-axis, the axes XYZ forming an orthonormal reference frame, the atom chip comprising:
- first and second coplanar waveguides (CPWX1, CPWX2) suitable for propagating microwaves at respective angular frequencies $\omega_a$ and $\omega_b$, said waveguides being placed symmetrically on either side of the X-axis and being referred to as X-wise guides,
- first and second coplanar waveguides (CPWY1, CPWY2) suitable for propagating microwaves at respective angular frequencies $\omega'_a$ and $\omega'_b$, said waveguides being placed symmetrically on either side of an axis the projection of which in the XY-plane is along an axis Y' that is different from the X-axis and that is contained in the XY-plane, and being referred to as Y'-wise guides,
- the X-wise guides being electrically insulated from the Y'-wise guides, an intersection of said guides forming a parallelogram of center O defining an origin of the reference frame XYZ,
- a first plurality of mutually parallel conductive wires (W1P) and a second plurality of mutually parallel conductive wires (W2P), a projection in the XY-plane of a wire of the first plurality and of a wire of the second plurality of conductive wires defining a crossing point,
- a projection in the XY-plane of said pluralities making between them an angle larger than or equal to 20°, a projection in the XY-plane of a wire of the first plurality and of a wire of the second plurality of conductive wires being secant at the point O, said first and second pluralities of conductive wires being arranged so that at least a set of the crossing points is inside said parallelogram, the method comprising:
- implementing steps A to E of the method as claimed in claim 17 to measure speeds of rotation about X, the first closed path (TX), contained in a plane perpendicular to X, being initialized from a first initialization crossing point (Cx) located on the X-axis,
- implementing steps A to E of the method as claimed in claim 17 to measure speeds of rotation about Y', the second closed path (TY'), contained in a plane perpendicular to Y', being initialized from a second initialization crossing point (Cy) located on the Y'-axis, and
- to measure the speed of rotation about the Z-axis, corresponding to the measurement axis:
- implementing steps A and B of the method as claimed in claim 17,
- a step C' consisting in spatially separating a cloud of said atoms of said internal state |a> in one trap (T1) from a cloud of said atoms of said internal state |b> in another trap (T2), and moving said traps in opposite directions along a closed path contained in a plane perpendicular to the Z-axis and initialized from a third initialization crossing point (Cz), by applying a voltage or a current at predetermined microwave frequencies to said first and second guides along one of the axes X and Y', which axis is referred to as the chosen axis, and by applying a DC current or voltage to the conductive wires of the first and of the second plurality of conductive wires in a predetermined sequence, so as to successively excite crossing points placed on or in the vicinity of the chosen axis,
- implementing steps D and E as claimed in claim 17.

* * * * *